(12) United States Patent
Raslambekov

(10) Patent No.: US 12,079,996 B1
(45) Date of Patent: Sep. 3, 2024

(54) METHOD AND SYSTEM FOR DETERMINING TOOTH-GINGIVA SEGMENTATION CONTOUR

(71) Applicant: Oxilio Ltd, Larnaca (CY)

(72) Inventor: Islam Khasanovich Raslambekov, Long Island City, NY (US)

(73) Assignee: Oxilio Ltd, Larnaca (CY)

( * ) Notice: Subject to any disclaimer, the term of this patent is extended or adjusted under 35 U.S.C. 154(b) by 0 days.

(21) Appl. No.: 18/224,032

(22) Filed: Jul. 19, 2023

(51) Int. Cl.
| | | |
|---|---|---|
| *G06T 15/00* | (2011.01) | |
| *A61C 7/00* | (2006.01) | |
| *A61C 13/34* | (2006.01) | |
| *G06T 7/12* | (2017.01) | |
| *G06T 7/149* | (2017.01) | |
| *G06T 7/162* | (2017.01) | |

(52) U.S. Cl.
CPC ............... *G06T 7/12* (2017.01); *A61C 7/002* (2013.01); *A61C 13/34* (2013.01); *G06T 7/149* (2017.01); *G06T 7/162* (2017.01); *A61C 2007/004* (2013.01); *G06T 2207/20116* (2013.01); *G06T 2207/30036* (2013.01)

(58) Field of Classification Search
CPC ............... A61C 7/002; A61C 13/0004; A61C 2007/004; G06T 2219/2004; G06T 19/20; G06T 2210/41; G16H 30/40; G16H 50/20; G06N 20/00
USPC ......................................................... 345/418
See application file for complete search history.

(56) References Cited

U.S. PATENT DOCUMENTS

| | | |
|---|---|---|
| 10,695,147 B1 | 6/2020 | Raslambekov |
| 10,993,782 B1 | 5/2021 | Raslambekov |
| 11,055,850 B1 | 7/2021 | Raslambekov |
| 11,351,011 B1 | 6/2022 | Raslambekov |
| 11,517,400 B1 | 12/2022 | Raslambekov |
| 2021/0186659 A1* | 6/2021 | Li .............................. G06T 7/11 |

(Continued)

FOREIGN PATENT DOCUMENTS

CN          112308861 A          2/2021

OTHER PUBLICATIONS

Meinhardt E, Zacur E, Frangi AF, Caselles V. 3D edge detection by selection of level surface patches. Journal of Mathematical Imaging and Vision. May 2009;34:1-6.*

(Continued)

*Primary Examiner* — Phu K Nguyen
(74) *Attorney, Agent, or Firm* — BCF LLP

(57) ABSTRACT

A method and system for determining an orthodontic treatment are provided. The method comprises: acquiring a 3D digital model representative of an arch form of the subject; generating a plurality of 3D curves on a surface of a given tooth; determining, for a given point of a given 3D curve, a curvature parameter; determining, based on the curvature parameter, a likelihood value of the given point being representative of a tooth-gingiva segmentation contour; generating, based on likelihood values associated with the points of the plurality of 3D cross-sectional curves, a graph whose nodes are representative of points of the plurality of 3D cross-sectional curves; determining, within the graph, a reference path including reference nodes such that a total likelihood value associated with the reference nodes is maximized; and determining the tooth-gingiva segmentation contour associated with the given tooth based on the reference path.

20 Claims, 15 Drawing Sheets

(56) References Cited

U.S. PATENT DOCUMENTS

2021/0196430 A1* 7/2021 Wilson .................. A61B 5/0088
2023/0087800 A1* 3/2023 Bielser .................. A61C 7/002
　　　　　　　　　　　　　　　　　　　　　　433/24

OTHER PUBLICATIONS

Tian S, Wang M, Ma H, Huang P, Dai N, Sun Y, Meng J. Efficient tooth gingival margin line reconstruction via adversarial learning. Biomedical Signal Processing and Control. Sep. 1, 2022;78:103954.*
Ben-Hamadou A, Smaoui O, Rekik A, Pujades S, Boyer E, Lim H, Kim M, Lee M, Chung M, Shin YG, Leclercq M. 3DTeethSeg'22: 3D Teeth Scan Segmentation and Labeling Challenge. arXiv preprint arXiv:2305.18277. May 29, 2023.*
U.S. Appl. No. 17/980,868, filed Nov. 4, 2022.

* cited by examiner

METHOD AND SYSTEM FOR DETERMINING TOOTH-GINGIVA SEGMENTATION CONTOUR

FIELD

The present technology relates to identifying contours between teeth and gingiva and between teeth and teeth.

BACKGROUND

An orthodontic treatment plan may be created for a subject. The movement of the subject's teeth based on an applied orthodontic treatment may be modelled as part of the creation of the treatment plan. The modelling may be based on images of the subject's teeth. The images may have been obtained using an intraoral scanner.

In certain modelling methods, movement of individual teeth are modelled and therefore it may be advantageous to segment the teeth from one another, and/or segment the teeth from the gingiva. Typically, a dentist (or another medical professional) may define the boundary between the teeth and the gingiva and/or the boundaries between the individual teeth.

However, this process may be time consuming; and the user-defined boundaries may be inaccurate.

Certain prior art approaches have been proposed tackle the above-identified technical problem.

U.S. Pat. No. 10,695,147-B1, issued on Jun. 30, 2020, assigned to Oxilio Ltd, and entitled "METHOD AND SYSTEM FOR DENTAL BOUNDARY DETERMINATION", discloses methods, systems, and apparatuses for determining a boundary between teeth and gingiva of an archform and/or between teeth and other teeth. Curves may be defined on the surface of teeth and gingiva in the archform. An indication of curvature at various points on the curves may be determined. A predicted likelihood parameter that each of the points corresponds to the boundary between the teeth and gingiva may be determined based on the indication of curvature. A smoothing function and the predicted likelihood parameter may be used to determine a boundary point for each curve. The boundary points may be connected to form the boundary between the teeth and gingiva.

U.S. Pat. No. 11,351,011-B1, issued on Jun. 7, 2022, assigned to Oxilio Ltd, and entitled "METHODS AND SYSTEMS FOR DETERMINING TOOTH STRUCTURE", discloses methods, systems, and apparatuses for generating a digital model of a tooth structure for a gap between neighboring teeth of an arch form of a patient. Position of a tooth structure between neighboring teeth may be determined. Arch lines extending through the plurality of teeth may be determined. Intermediate points in the interdental gap may be determined. Longitudinal axis of the tooth structure relative to the neighboring teeth may be derived. A digital model of the tooth structure may be aligned on the longitudinal axis and a digital model of the tooth structure may be obtained.

U.S. Pat. No. 11,055,850-B1, issued on Jul. 6, 2021, assigned to Oxilio Ltd, and entitled "SYSTEMS AND METHODS FOR TOOTH SEGMENTATION", discloses a method and a system for determining an orthodontic treatment for a plurality of teeth of a subject. The method comprises: receiving a 3D representation of a first tooth and a second tooth, adjacent thereto, of the subject, of a plurality of teeth of the subject; obtaining a tooth-gingiva segmentation loop; identifying an outer set of vertices positioned outside the tooth-gingiva segmentation loop and an inner set of vertices positioned inside the tooth-gingiva segmentation loop; determining a shortest path from the outer set of vertices to the inner set of vertices; generating, based on the shortest path, a first interdental loop indicative of an interdental boundary between the first tooth and the second tooth, the first interdental loop intersecting the tooth-gingiva segmentation loop; generating a boundary between the first tooth and the second tooth, the boundary including the tooth-gingiva segmentation loop and the first interdental loop.

CN Patent Application Publication No.: 112,308,861-A, published on Feb. 2, 2021, assigned to Shanghai Smartee Denti Technology Co Ltd, and entitled "TOOTH AND GUM SEGMENTATION METHOD, TOOTH SEGMENTATION METHOD AND ELECTRONIC DEVICE", discloses a tooth and gum segmentation method, a tooth segmentation method and electronic equipment. The tooth and gum division method comprises the following steps: acquiring data information of a digital dental model to be segmented, wherein the digital dental model is a triangular patch model; selecting a first type of characteristic points on the digital dental model; classifying the first type of feature points, and determining that the first type of feature points belong to a tooth area or a gum area; classifying second type of feature points on the digital dental model according to the classification result of the first type of feature points, and determining that the second type of feature points belong to a tooth area or a gum area; respectively merging the second type of characteristic points belonging to the tooth area and the second type of characteristic points belonging to the gum area to obtain a divided tooth area and a divided gum area; and the second type of characteristic points are confirmed according to the vertexes of the triangular patch mesh in the digital dental model, so that the teeth are segmented more accurately.

SUMMARY

It is an object of the present technology to improve at least some approaches directed to determining boundaries between teeth and gingiva present in the prior art.

Embodiments of the present technology have been developed based on developers' appreciation that automatic determination of a boundary between teeth and gingiva (referred to herein as a "tooth-gingiva segmentation contour") and/or boundaries between teeth and other teeth, may be beneficial to users.

Embodiments of the present technology have been developed based on developers' appreciation that automatic determination of the tooth-gingiva segmentation contour may be more accurate than manual definition of those boundaries.

More specifically, at least some non-limited embodiments of the present methods for determining the tooth-gingiva segmentation contour include: (i) identifying, along a surface of a given tooth, a plurality of cross-sectional curves; (ii) determining, for each point defining a given cross-sectional curve, a respective likelihood value of a given point being representative of the tooth-gingiva segmentation contour; and (iii) generating a directed layered graph whose nodes in a given layer are representative of points of a respective cross-sectional curve. Further, the present methods, in at least some non-limiting embodiments of the present technology, may include traversing the so generated directed layered graph maximizing a total likelihood value, thereby identifying points defining the tooth-gingiva segmentation contour associated with the given tooth.

The methods, systems, and apparatuses described herein may reduce the amount of time and/or computing resources used to determine the tooth-gingiva segmentation contour for the given tooth compared to approaches used in the prior art. For example, the developers have appreciated that generating and using the directed layered graph for identifying points defining the tooth-gingiva segmentation contour may be more efficient in terms of computational resources of a processor than training a machine-learning algorithm for this purpose.

Further, the tooth-gingiva segmentation contour may be used for developing orthodontic treatments and manufacturing various orthodontic appliances. A non-exhaustive list of examples for using the tooth-gingiva segmentation contour can include, without limitation: (i) identifying, within 3D digital models of a subject's teeth, individual teeth, for example, for further modelling their movements; (ii) reconstructing 3D digital models of the roots of the subject's teeth; (iii) determining an open edge of an orthodontic aligner; (iv) identifying, on the surface of the given tooth, work areas for orthodontic attachments; etc.

Therefore, a more computationally efficient approach to determining the tooth-gingiva segmentation contour may allow for a more efficient determination of orthodontic treatments and manufacturing the orthodontic appliances.

In accordance with a first broad aspect of the present technology, there is provided a computer-implementable method of determining an orthodontic treatment for a subject. The method can be executed by a processor. The method comprises: acquiring a 3D digital model including a representation of an arch form of the subject, the arch form including the given tooth and the gingiva, the given tooth being associated with a tooth axis; generating a plurality of cross-sectional planes dissecting the given tooth, in the 3D digital model, through the tooth axis thereof, thereby generating a plurality of 3D cross-sectional curves; analyzing a curvature of a given 3D cross-sectional curve of the plurality of 3D cross-sectional curves to determine, for a given point thereof, a respective curvature parameter; determining, based on the respective curvature parameter of the given 3D cross-sectional curve at the given point, a respective likelihood value of the given point being representative of a tooth-gingiva segmentation contour; generating, based on respective likelihood values associated with points of each one of the plurality of 3D cross-sectional curves, a directed layered graph whose nodes are representative of points of the plurality of 3D cross-sectional curves; determining, from an initial node to a terminal node of the directed layered graph, a path including a plurality of reference nodes such that a total likelihood value of respective likelihood values associated with the plurality of reference nodes is maximized; determining, the tooth-gingiva segmentation contour associated with the given tooth as a contour extending through respective points of the plurality of 3D cross-sections curves corresponding to the plurality of reference nodes of the directed layered graph; and storing data representative of the tooth-gingiva segmentation contour for further use in the determining the orthodontic treatment.

In some implementations of the method, the generating the directed layered graph is executed such that: (i) a given layer of the directed layered graph is representative of points defining the respective one of the plurality of 3D cross-sectional curves; (ii) a given node of the directed layered graph is representative of a respective point of a respective one of the plurality of 3D cross-sectional curves; and (iii) a given edge of the directed layered graph is representative of a connection between points of two adjacent ones of the plurality of 3D cross-sectional curves.

In some implementations of the method, the generating the plurality of cross-sectional planes comprises generating the plurality of cross-sectional planes through a tooth axis of the given tooth.

In some implementations of the method, the plurality of cross-sections planes is distributed within a predetermined angle around the tooth axis.

In some implementations of the method, the generating the plurality of cross-sections planes is such that the plurality of cross-sectional planes are shifted horizontally along a surface of the given tooth relative to each other.

In some implementations of the method, the plurality of cross-sectional planes comprises a predetermined number of cross-sectional planes.

In some implementations of the method, the plurality of cross-sectional planes is uniformly distributed along a surface of the given tooth.

In some implementations of the method: the analyzing the curvature of the given 3D cross-sectional curve comprises converting the given 3D cross-sectional curve into a respective 2D cross-sectional curve; and determining the respective curvature parameter at the given point of the given 3D cross-sectional curve comprises determining the respective curvature parameter at a corresponding point of the respective 2D cross-sectional curve.

In some implementations of the method, prior to the analyzing, further comprising trimming a portion of the given 3D cross-sectional curve extending along an occlusal surface of the given tooth.

In some implementations of the method, the respective curvature parameter, at the corresponding point of the respective 2D cross-sectional curve, comprises at least one of: (i) an angle of a respective tangent vector extending from the corresponding point to a next sequential point of the respective 2D cross-sectional curve; (ii) a segment curvature value of a segment extending from the corresponding point to the next sequential point of the respective 2D cross-sectional curve; and (iii) a point curvature value at the corresponding point comprising an average segment curvature value of a plurality of segments extending through the corresponding point of the respective 2D cross-sectional curve.

In some implementations of the method, the method further comprises determining the segment curvature value according to a formula:

$$\text{Segment curvature} = \frac{(\text{TangentVector}[\text{nextPoint}] - \text{TangentVector}[\text{givenPoint}])}{\text{SegmentLength}},$$

where TangentVector[givenPoint] is the angle of the respective tangent vector at the corresponding point of the respective 2D cross-sectional curve;
TangentVector[nextPoint] is an angle of the respective tangent vector at the next sequential point of the respective 2D cross-sectional curve; and
SegmentLength is a length of the segment.

In some implementations of the method, the plurality of segments for determining the point curvature includes a predetermined number of segments.

In some implementations of the method, the determining the respective likelihood value of the given point is such that the greater the respective curvature parameter is, the greater the respective likelihood value is.

In some implementations of the method: the 3D digital model comprises a plurality of mesh elements defining a surface of the arch form of the subject; the plurality of cross-sectional planes dissects the given tooth along two opposing surfaces thereof; and wherein the determining the tooth-gingiva segmentation contour comprises: identifying, from the respective points of the plurality of 3D cross-sectional curves corresponding to the plurality of reference nodes of the directed layered graph, along each of the opposing surfaces: a first edge point and a second edge point; and joining, the first and second edge points on both opposing surfaces of the given tooth along edges of the plurality of mesh elements of the 3D digital model.

In some implementations of the method, the joining comprises applying a shortest path algorithm.

In some implementations of the method, the shortest path algorithm is a Dijkstra's shortest path algorithm.

In some implementations of the method, the two opposing surfaces comprise a labial surface and a lingual surface of the given tooth.

In some implementations of the method, the method further comprises: identifying: (i) a portion of the tooth-gingiva segmentation contour associated with the given tooth extending through an interdental space between the given tooth and an adjacent tooth; and (ii); and identifying a portion of an other tooth-gingiva segmentation contour associated with the adjacent tooth extending through the interdental space; and merging the portions into a single portion of both the tooth-gingiva segmentation contour and the other tooth-gingiva segmentation contour associated with the given and adjacent teeth and extending through the interdental space therebetween.

In some implementations of the method, the method further comprises smoothing the tooth gingiva segmentation contour.

In some implementations of the method, the method further comprises causing display of the tooth-gingiva segmentation contour associated with the given tooth within the 3D digital model.

In accordance with a second broad aspect of the present technology, there is provided a system for determining an orthodontic treatment for a subject. The system comprises at least one processor and at least one non-transitory computer-readable medium comprising executable instructions that when executed by the at least processor, cause the system to: acquire a 3D digital model including a representation of an arch form of the subject, the arch form including the given tooth and the gingiva, the given tooth being associated with a tooth axis; generate a plurality of cross-sectional planes dissecting the given tooth, in the 3D digital model, through the tooth axis thereof, thereby generating a plurality of 3D cross-sectional curves; analyze a curvature of a given 3D cross-sectional curve of the plurality of 3D cross-sectional curves to determine, for a given point thereof, a respective curvature parameter; determine, based on the respective curvature parameter of the given 3D cross-sectional curve at the given point, a respective likelihood value of the given point being representative of a tooth-gingiva segmentation contour; generate, based on respective likelihood values associated with points of each one of the plurality of 3D cross-sectional curves, a directed layered graph whose nodes are representative of points of the plurality of 3D cross-sectional curves; determine, from an initial node to a terminal node of the directed layered graph, a path including a plurality of reference nodes such that a total likelihood value of respective likelihood values associated with the plurality of reference nodes is maximized; determine a tooth-gingiva segmentation contour associated with the given tooth as a contour extending through respective points of the plurality of 3D cross-sections curves corresponding to the plurality of reference nodes of the directed layered graph; and store, in the at least one non-transitory computer-readable memory, data representative of the tooth-gingiva segmentation contour for further use in the determining the orthodontic treatment.

In some implementations of the system, the at least one processor further causes the system to generate the directed layered graph such that: (i) a given layer of the directed layered graph is representative of points defining the respective one of the plurality of 3D cross-sectional curves and connections therewithin; (ii) a given node of the directed layered graph is representative of a respective point of a respective one of the plurality of 3D cross-sectional curves; and (iii) a given edge of the directed layered graph is representative of a connection between points of two adjacent ones of the plurality of 3D cross-sectional curves.

In the context of the present specification, the term "orthodontic treatment" is broadly referred to as any type of medical intervention aimed at correcting malocclusions associated with the subject's teeth, including surgical and non-surgical manipulations, such as, but not limited to, using aligners. Further, the orthodontic treatment, as referred to herein, may be determined by a professional practitioner in the field of dentistry (such as an orthodontist, a maxillofacial surgeon, for example), or automatically by a specific software, based on respective image data and input parameters associated with the subject.

In the context of the present specification, unless expressly provided otherwise, a computing device and/or computer system may refer, but is not limited to, an "electronic device," an "operation system," a "system," a "computer-based system," a "controller unit," a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first," "second," "third," etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object might not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not to scale.

DETAILED DESCRIPTION

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural or functional modifications may be made, without departing from the scope of the present disclosure.

A 3D digital model (also referred to herein as "model") of a subject's archform may be generated based on images and/or scans of the subject's mouth, such as images and/or scans of the teeth and gingiva of the subject generated, for example, by an imaging device. The model may represent surfaces of portions of teeth and gingiva of the subject. In some non-limiting embodiments of the present technology, the imaging device can comprise an intraoral scanner, and the model can hence comprise a three dimensional (3D) mesh in which a plurality of vertices are connected to each other by edges representing surfaces of the teeth and gingiva of the subject. In other non-limiting embodiments of the present technology, the model can comprise a cloud of points representative of the surfaces of the teeth and gingiva of the subject. In these embodiments, the model can be either (i) initially generated as including points, such as by a 3D laser scanner; or (ii) a post-processed 3D mesh where the edges connecting vertices have been removed.

The model may be analyzed to identify various portions of the archform. Boundaries between teeth and gingiva (referred to herein as "tooth-gingiva segmentation contour") and/or between teeth and teeth may be determined.

Various assumptions may be made in order to determine the tooth-gingiva segmentation contour. For example, the points defining the tooth-gingiva segmentation contour are typically located along portions of the surface of the given tooth having a relatively high curvature. The tooth and the gingiva may have different curvature patterns from each other. This known domain information may be used to determine the tooth-gingiva segmentation contour between the given tooth, the gingiva, and the neighboring teeth.

Figure 1:
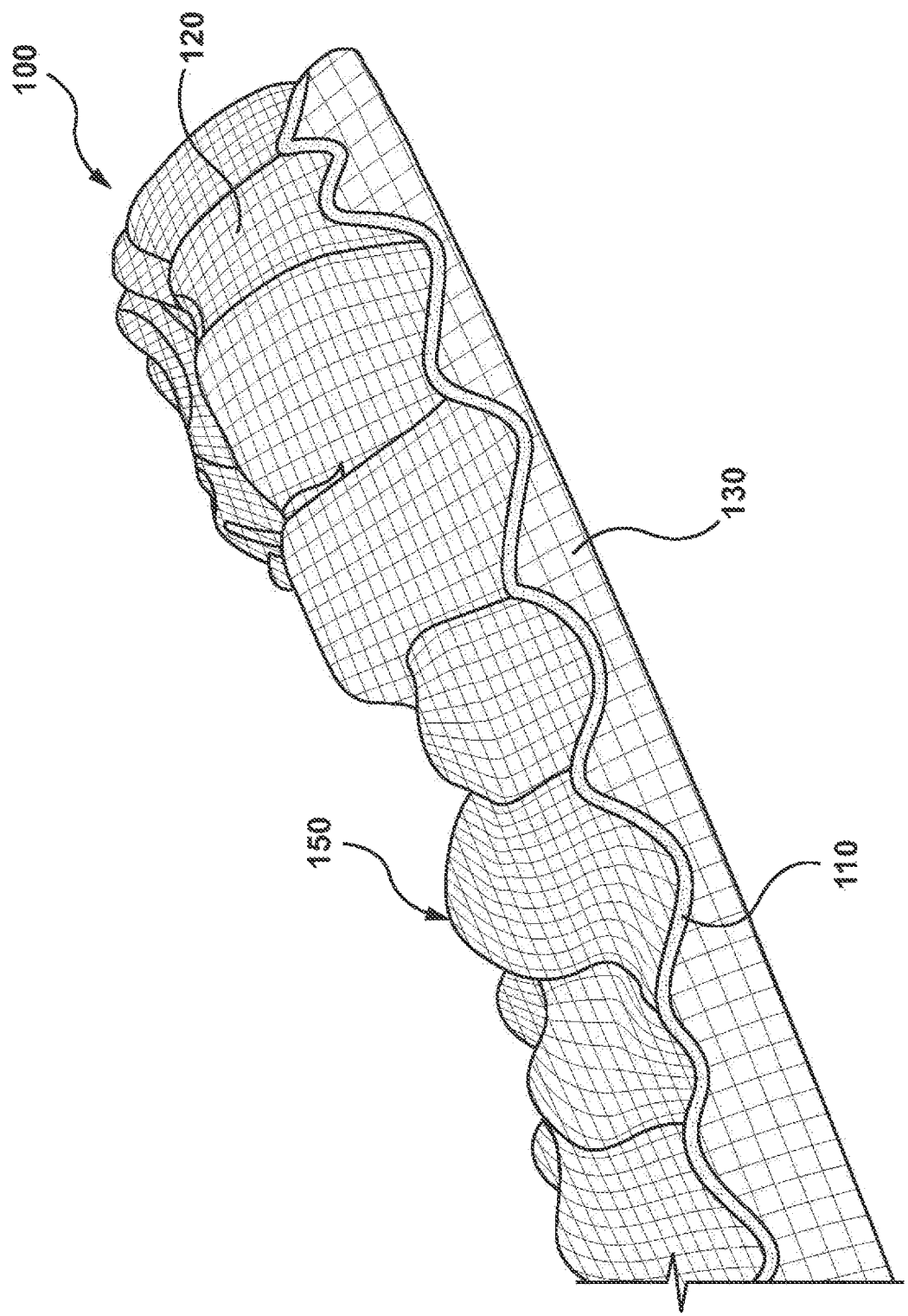
FIG. 1 shows an example of an archform 3D digital model representative of subject's teeth and gingiva according to non-limiting embodiments of the present technology.

FIG. 1 shows an example of an archform 3D digital model 100 according to certain non-limiting embodiments of the present technology. As mentioned above, the archform 3D digital model 100 can be composed of vertices which are connected by edges. However, in other non-limiting embodiments of the present technology, the archform 3D model can comprise a respective 3D point cloud.

The archform 3D digital model 100 represents teeth 120 and a gingiva 130 of a subject. Although the archform 3D digital model 100 illustrates the lower part of the subject's mouth ("lower arch" or "mandible"), it should be understood that a similar archform 3D digital model can be provided for an upper portion ("upper arch" or "maxilla") of the subject's mouth. In other non-limiting embodiments of the present technology, the archform 3D digital model 100 can be representative of both the lower and the upper portion of the patient's mouth.

A tooth-gingiva segmentation contour 110 separates a given tooth 150 of the teeth 120 from the gingiva 130. The tooth-gingiva segmentation contour 110 may be representative of a gumline of the subject's archform. The tooth-gingiva segmentation contour 110 may be manually identified, or drawn, by a user (such as a dental practitioner or the like) viewing the archform 3D digital model 100.

In accordance with certain non-limiting embodiments of the present technology, the tooth-gingiva segmentation contour 110 may be determined using various methods described herein, such as a first method 200 described below with reference to FIGS. 2A-C. The archform 3D digital model 100 may be generated based on one or more images, scans, and/or other collected data regarding a subject's mouth. The archform 3D digital model 100 may also be generated based on a physical mold representing the teeth 120 and the gingiva 130 of the subject.

Figure 2A:
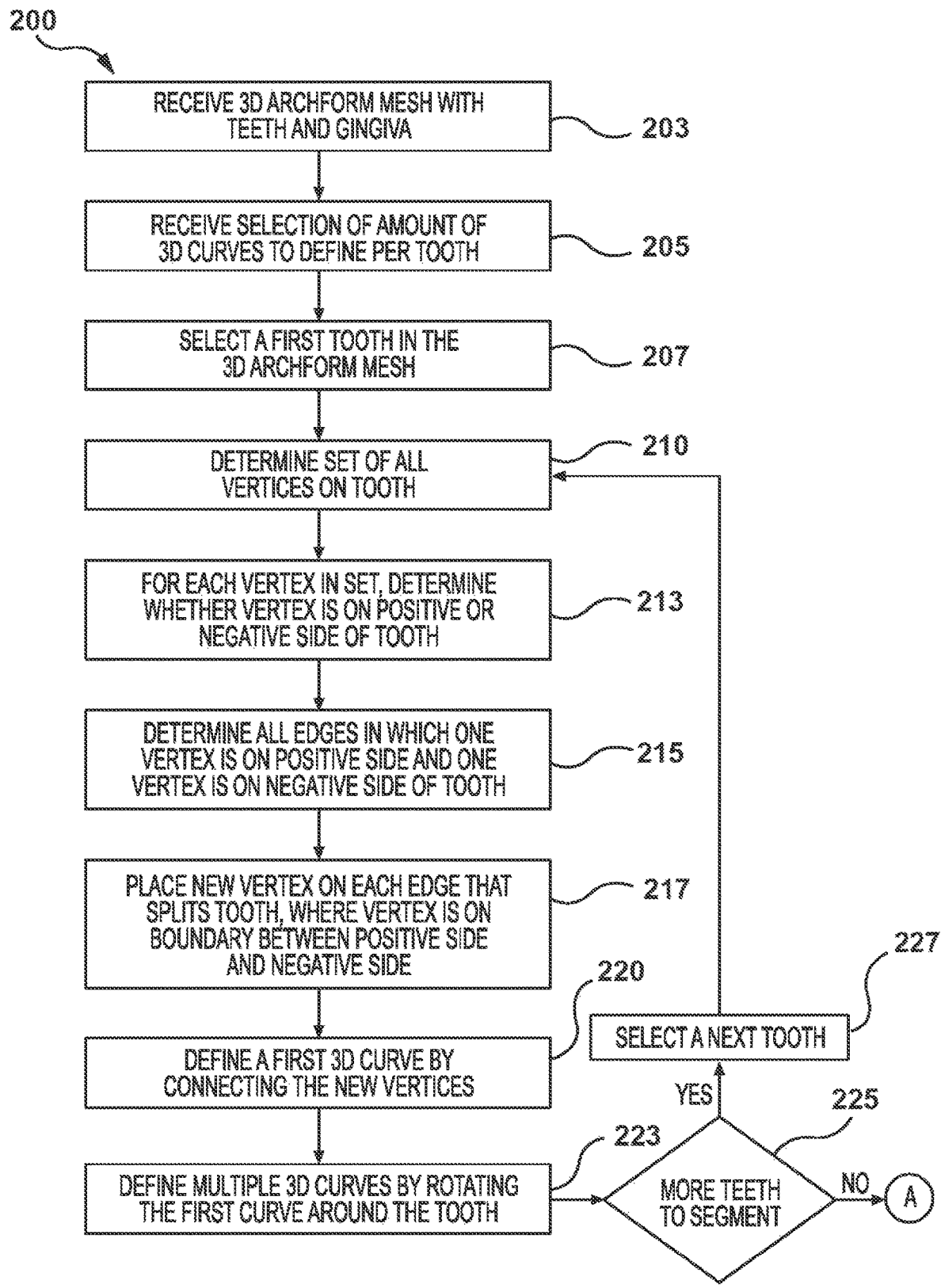
FIGS. 2A-C are flowchart diagrams of a method for determining tooth-gingiva segmentation contour for a given tooth of the subject according to non-limiting embodiments of the present technology.
Figure 2B:
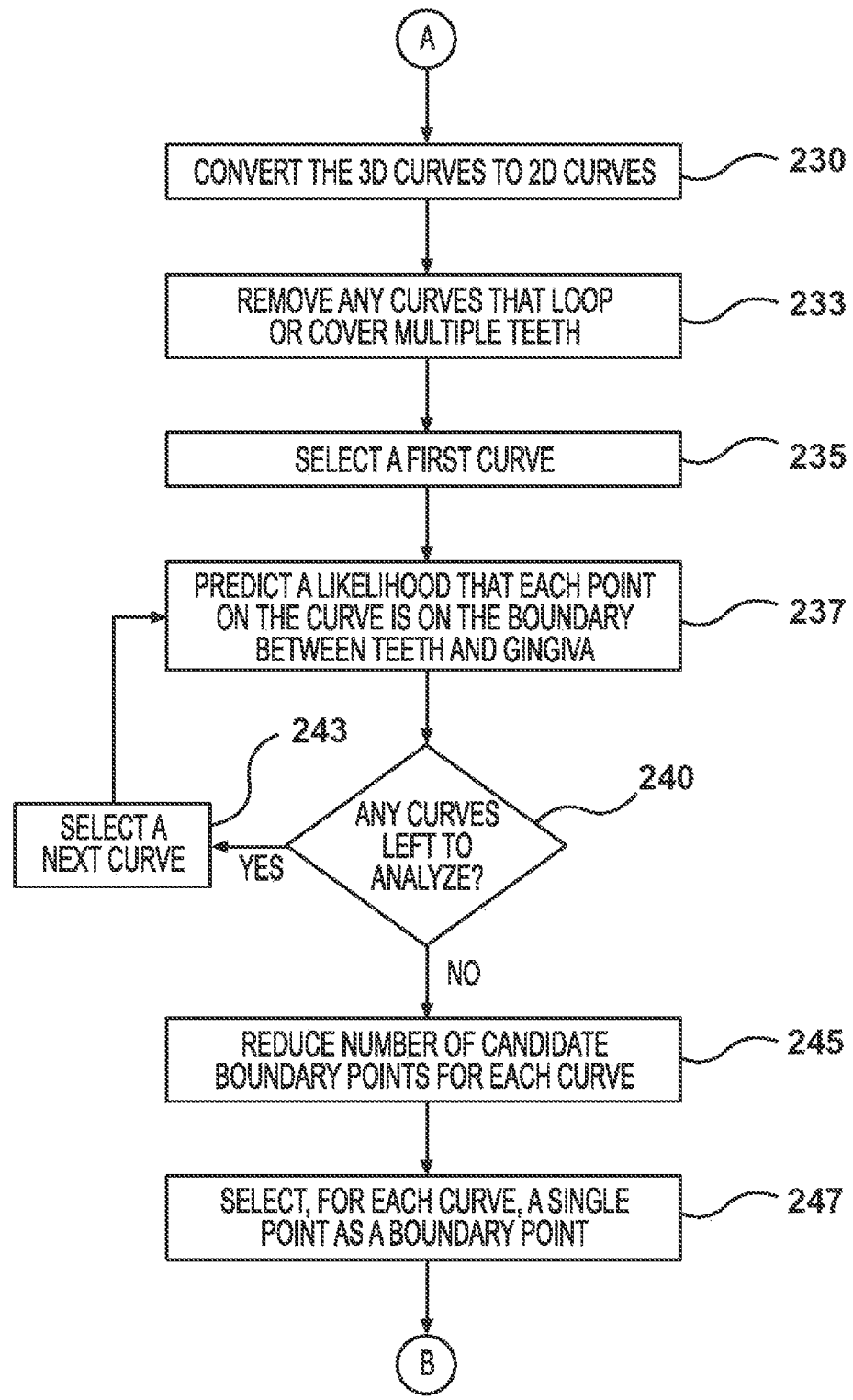
Figure 2C:
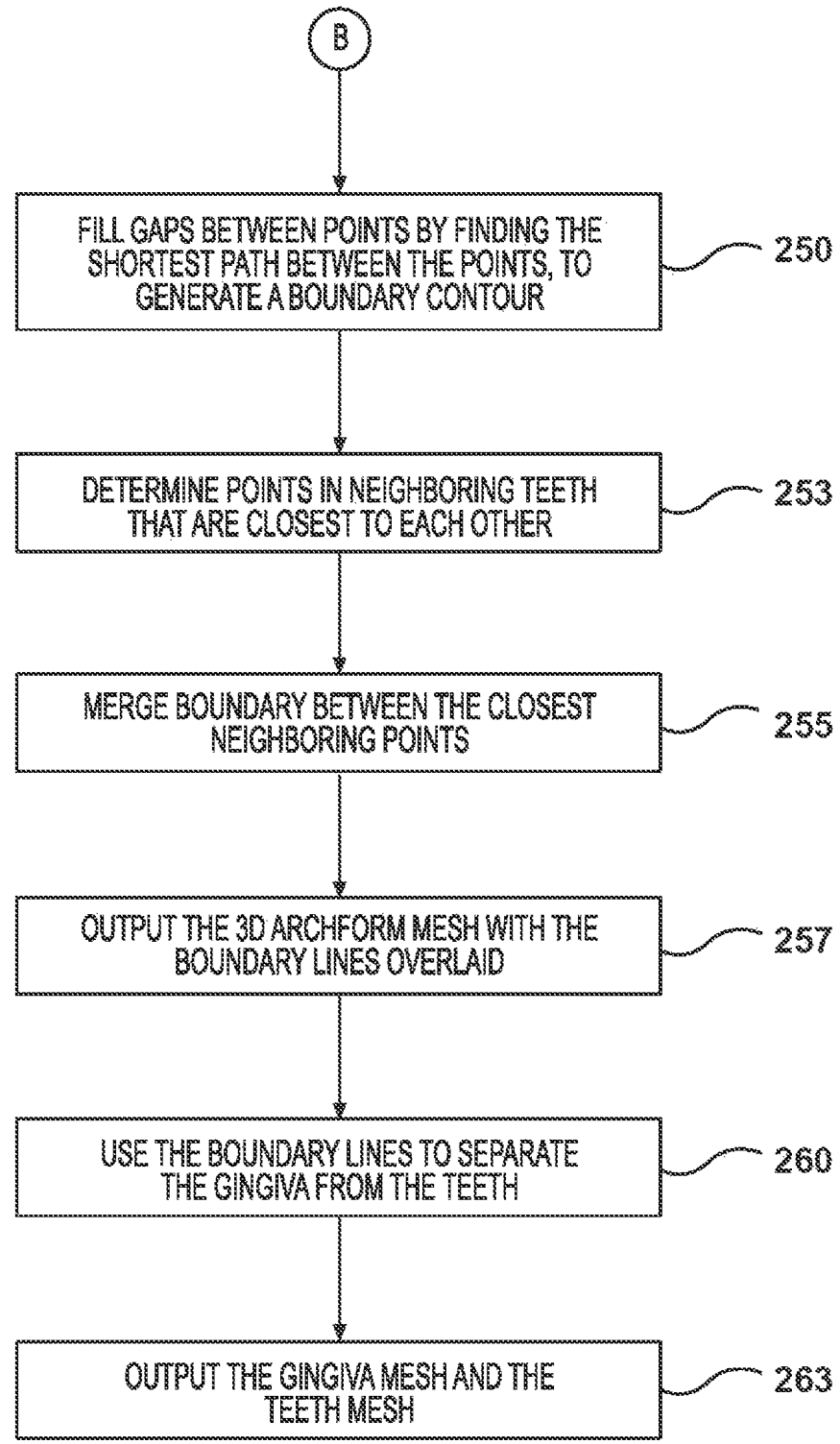

With reference to FIGS. 2A-C, there is depicted a flowchart diagram of the first method 200 for determining the tooth-gingiva segmentation contour 110 between the given tooth 150 and the gingiva 130 in an archform of the subject, in accordance with certain non-limiting embodiments of the present technology. The first method 200 can be executed, for example, by a processor 1310 of a computing device 1300, description of which will be provided below with reference to FIG. 13.

At step 203, the processor 1310 can be configured to receive a 3D digital model of the subject's archform, such as the archform 3D digital model 100 mentioned above. As mentioned hereinabove, the archform 3D digital model 100 can be representative of the teeth 120 and the gingiva 130 of the subject.

At step 205, the processor 1310 can be configured to receive a selection of a number of 3D curves to define per tooth, such as the given tooth 150. The selection may comprise a number of cross-sectional planes dissecting the surface of the given tooth 150. For example, the selection may comprise a degree interval at which the curves and/or planes are to be rotated around a vertical axis of the given tooth 150, as will be described in detail below. The selection may comprise an instruction to define a same number of curves for each tooth in the archform mesh. The selection may indicate different numbers of curves for each individual tooth of the archform mesh. Although described as receiving a selection at step 205, the number of 3D curves to define may be predetermined, such as during configuration of software performing the first method 200. As the number of curves defined increases, the accuracy of determining the tooth-gingiva segmentation contour 110 may increase as well. But, as the number of curves defined increases, the amount of time, memory, processing cycles, and/or other computing resources of processor 1310 used to perform all or portions of the first method 200 may increase.

In some non-limiting embodiments of the present technology, the number of curves to be defined may be determined rather than selected. For example the number of curves may be determined based on an amount of available memory and/or processing power. The number of curves may be determined based on a desired runtime for determining the boundary. For example a desired maximum runtime may be selected, and the amount of curves may be calculated based on determining, given a hardware configuration, the maximum amount of curves that can be defined in order to determine a boundary while satisfying the desired maximum runtime.

At step 207, the processor 1310 can be configured to select a first tooth, such as the given tooth 150, in the archform 3D digital model 100. In some non-limiting embodiments of the present technology, the processor 1310 can be configured to select the given tooth 150 randomly. Alternatively, a pre-set order may be used for selecting the given tooth 150. Although the steps in FIG. 2 are described in a linear fashion, the steps may be performed in parallel manner. For example, multiple teeth may be analyzed simultaneously using the steps described below. The locations of the teeth may be automatically determined and/or manually input by a user.

At step 210, the processor 1310 can be configured to determine a set of all vertices of the archform 3D digital model 100 corresponding to the current tooth, that is, in the present example, the given tooth 150. The vertices may be all of the vertices on the surface of the given tooth 150. As described above, in those embodiments where the archform 3D digital model 100 is a 3D mesh, a vertex is a point in the archform 3D digital model 100 at which two or more edges meet. One or more points on the surface of the given tooth 150 may be selected by the user. Two points may be selected, on opposite sides of the tooth. The two selected points may be points on opposite sides of a long horizontal axis of the given tooth 150. An elliptical cylinder may be determined based on the user-selected points. The center of the cylinder may correspond to a tooth (vertical) axis of the given tooth 150. A set of all vertices of the mesh that fit within the cylinder may be selected as the set of all vertices corresponding to the current tooth.

Further, at step 213, the processor 1310 can be configured to analyze each vertex in the set to determine whether a given vertex is on a positive or negative side of the given tooth 150. For example, the positive side may be determined as being an outwardly facing side of the given tooth 150, that is, a buccal side thereof; and the negative side may be determined as being an inwardly facing side of the given tooth 150, that is a lingual side thereof; or vice versa. According to certain non-limiting embodiments of the present technology, the processor 1310 can be configured to label each vertex either as a positive vertex or a negative vertex. A jaw inward vector may be calculated for the given tooth 150, such as based on two selected points for the given tooth 150. The jaw inward vector may be used to determine whether vertices are on the positive or negative side of the given tooth 150. Rather than determining what side of the given tooth 150 each vertex is on, a determination may be made for each determined curve, as will be described below.

At step 215, according to certain non-limiting embodiments of the present technology, the processor 1310 can be configured to analyze the edges corresponding to the vertices labeled at step 213. As a result, in some non-limiting embodiments of the present technology, the processor 1310 can be configured to identify a set of edges, where each edge in the set has one vertex labeled as a positive vertex and one vertex labeled as a negative vertex. Each edge in the set of edges may cross a boundary between the positive and negative side of the given tooth 150.

At step 217, according to certain non-limiting embodiments of the present technology, the processor 1310 can be configured to generate a new vertex on each of the edges in the set of edges identified at step 215. The new vertex may be generated on the boundary between the positive and negative side of the given tooth 150. The new vertex may be placed at the center of the edge, i.e., equidistant from the two vertices forming a given edge of the set.

Figure 3:
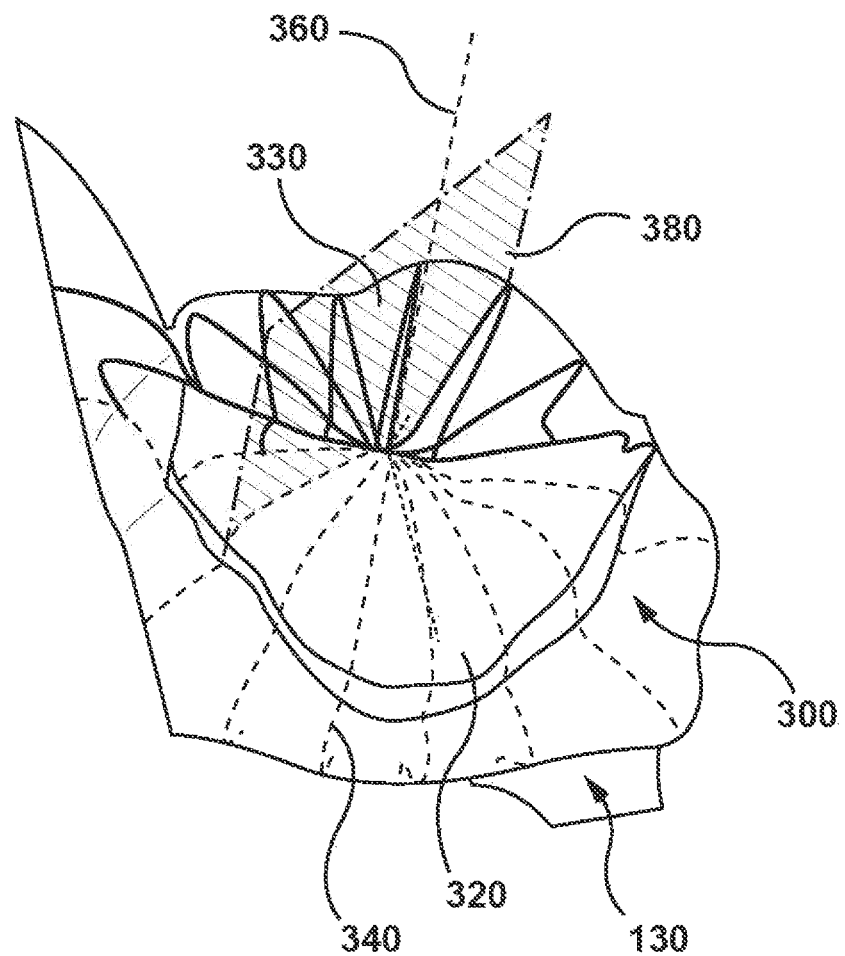
FIG. 3 shows an example of 3D curves defined on the given tooth in a circular manner according to non-limiting embodiments of the present technology.

At step 220, the processor 1310 can be configured to define a first 3D curve may be defined by connecting the new vertices that were added at step 217. The first 3D curve may comprise a curve that separates the positive and negative sides of the given tooth 150. FIG. 3, described in further detail below, illustrates an example of curves on the given tooth 150. The length of the first 3D curve may be predetermined. The length of the first 3D curve may be based on known anatomical features, such as an average distance between the top of a tooth and the gingiva, for example, for a given age or sex of the subject.

At step 223 a plurality of 3D curves may be defined by rotating the first 3D curve around the given tooth 150. The step of the rotation, or angle in between the 3D curves, may be determined based on the selected number of curves to generate per tooth received at step 205. In some non-limiting embodiments of the present technology, the processor 1310 can be configured to select the curves such that they are defined uniformly along the surface of the given tooth 150 in the archform 3D digital model 100. For example if a user requests that 10 curves be generated per tooth, 36 degrees will separate each curve.

Figure 4:
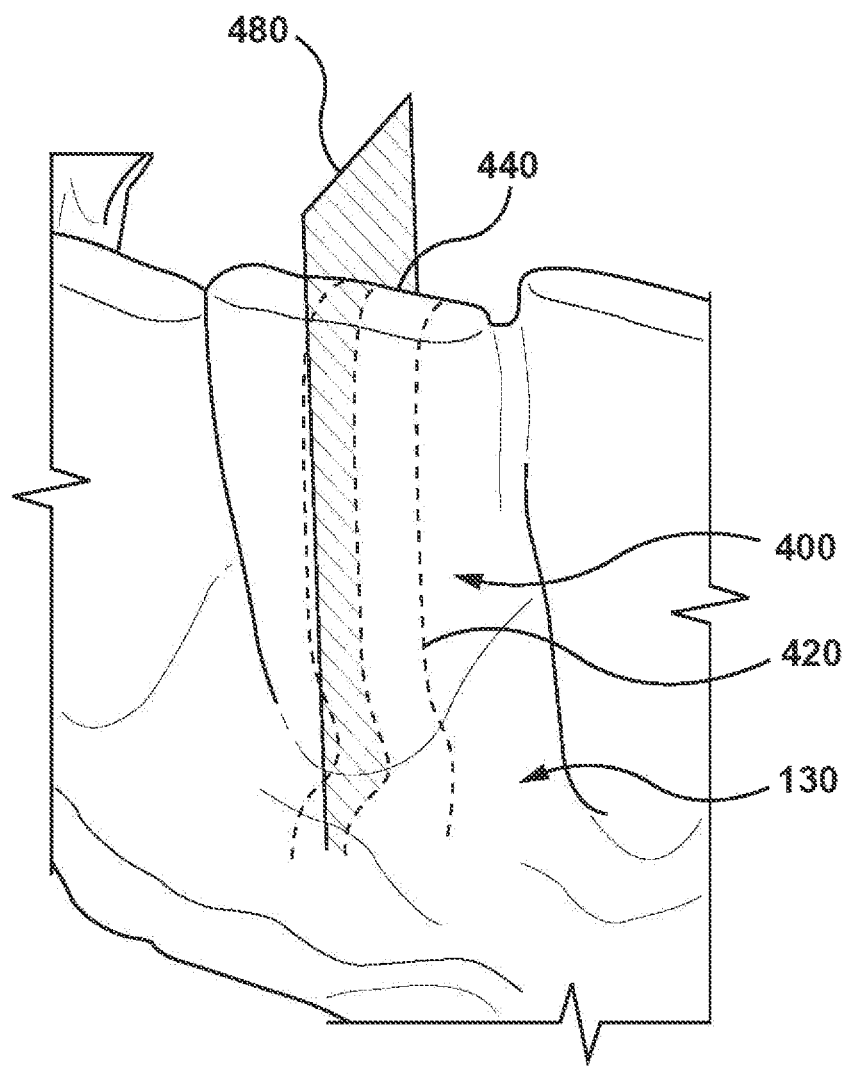
FIG. 4 shows an example of 3D curves defined on the given tooth in a horizontal manner according to non-limiting embodiments of the present technology.

Although a method of defining the 3D curves by rotation is described in the first method 200, other methods of defining a set of curves may be used. Rather than rotating a curve, the curve could be shifted horizontally along the teeth to define a series of curves. FIG. 4, described in further detail below, provides an illustration of a set of curves defined via horizontal shifting.

Rather than determining a curve and rotating or shifting the curve, in some non-limiting embodiments of the present technology, the processor 1310 can be configured to define the curves by generating a respective plurality of cross-sectional planes extending through the surface of the given tooth 150.

In some non-limiting embodiments of the present technology, the processor 1310 can be configured to generate the respective plurality of cross-sectional planes to extend through a tooth axis associated with the given tooth 150—such as a given cross-sectional plane 380 extending through a central tooth axis 360 as depicted in FIG. 3. As it can be appreciated, in these embodiments, the processor 1310 can be configured to generate the respective plurality of cross-sectional planes in a circular manner around the given tooth 150.

It is not limited how the processor 1310 can be configured to obtain data of (or otherwise determine) the central tooth axis 360. In some non-limiting embodiments of the present technology, the data of the tooth axis 360 can be provided by a dental practitioner. However, in other non-limiting embodiments of the present technology, the processor 1310 can be configured to determine the central tooth axis 360, based on a crown portion of the given tooth 150 within the archform 3D digital model as described in a co-owned U.S. Pat. No. 10,856,954-B1 issued on Dec. 8, 2020, and entitled "SYSTEMS AND METHODS FOR DETERMINING TOOTH CENTER OF RESISTANCE", the content of which is hereby incorporated by reference in its entirety.

Accordingly, the given cross-sectional plane can be used for defining a respective 3D curve in the positive and negative sides of the given tooth 150. In other non-limiting embodiments of the present technology, the processor 1310 can be configured to generate the respective plurality of cross-sectional planes to be shifted horizontally along the given tooth 150, as depicted in FIG. 4.

It should be expressly understood that other fashions of defining the respective plurality of cross-sectional planes through the surface of the given tooth 150 for generating the plurality of 3D curves are also envisioned without departing from the scope of the present technology.

The number of planes generated may be determined based on the input received at step 205, and can comprise, for example, 5, 10, or 20 planes. In some non-limiting embodiments of the present technology, the planes can be distributed along the surface of the given tooth 150 uniformly, based, for example, on a predetermined angle between each pair of planes.

A given curve may then be defined for each cross-sectional plane, at the points where the plane intersects the surface of the given tooth 150. Two respective curves may be defined for each cross-sectional plane, one being on the positive side of the given tooth 150 and the other on the negative side of the given tooth 150.

Each defined curve may be analyzed to determine whether that curve corresponds to the positive or negative side of the tooth. A jaw inward vector may be calculated for each curve and used to determine whether the curve corresponds to the positive or negative side of the tooth.

At step 225 a determination may be made as to whether there are additional teeth to segment in the archform 3D digital model 100. If there are additional teeth to segment, the processor 1310 can be configured to select a next tooth at step 227 and then determine a set of all vertices on that tooth at step 210.

Figure 5:
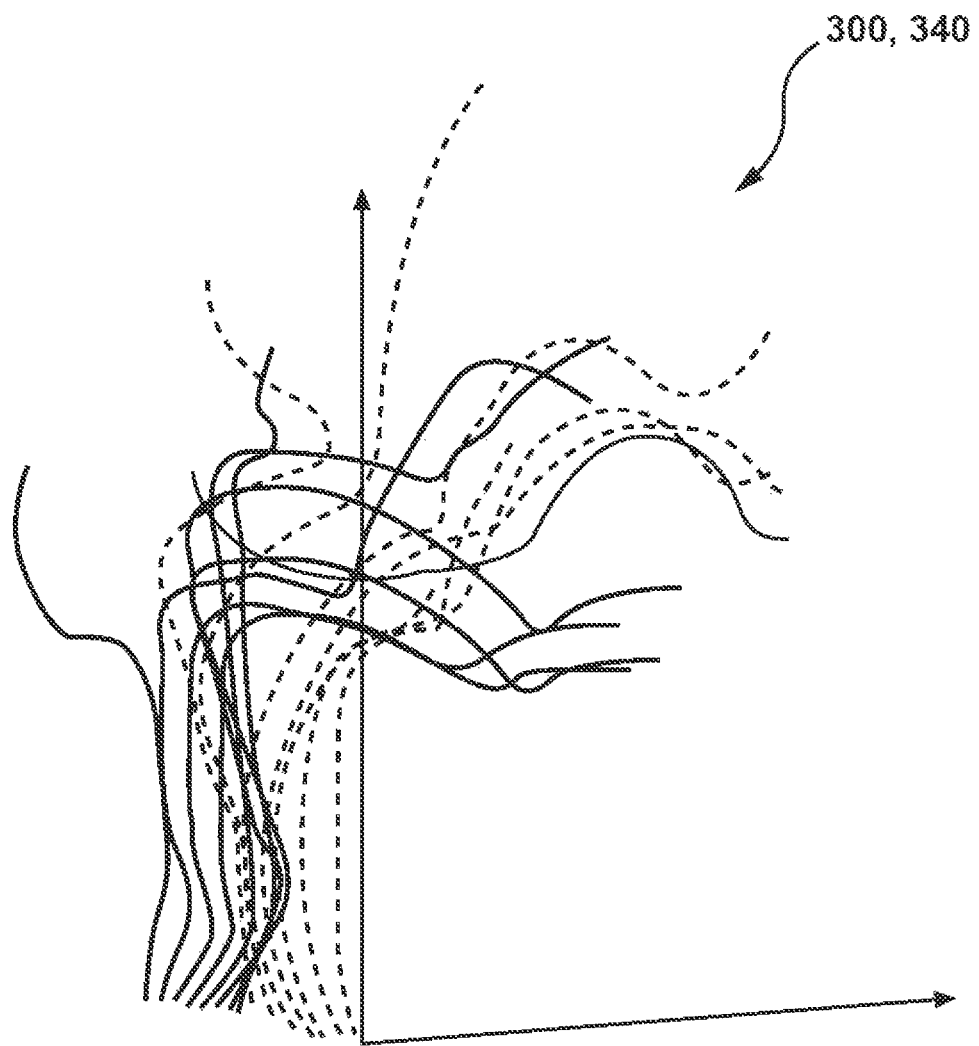
FIG. 5 shows an example of two dimensional (2D) curves, generated based on the 3D curves either of FIG. 3 or FIG. 4, according to non-limiting embodiments of the present technology.

If a determination is made at step 225 that all of the teeth 130 in the archform 3D digital model 100 have been segmented, at step 230, in some non-limiting embodiments of the present technology, the processor 1310 can be configured to convert all of the 3D curves to two dimensional (2D) curves. FIG. 5, discussed in further detail below, illustrates 3D curves that have been converted to 2D curves. The curves, either before or after the conversion, may be modified. For example, in some non-limiting embodiments of the present technology, the length of the curves may be reduced by removing one or more sections of the curve. For example, the processor 1310 can be configured to remove a section of a curve corresponding to an occlusal surface of the given tooth 150. The section or sections of the curve to be removed may be determined based on known anatomical data, such as an average tooth head size. The section of the curve corresponding to the tooth head may be determined based on position, tangent angles, and/or other metrics corresponding to the curve.

Further, at step 233, the processor 1310 can be configured to analyze the set of 2D curves to determine whether any of the curves comprise loops and/or whether any of the curves are on the surface of more than one tooth. Further, in some non-limiting embodiments of the present technology, the processor 1310 can be configured to remove any curves that comprise loops and/or are on the surface of more than one tooth may from the set of 2D curves. In some non-limiting embodiments of the present technology, the processor 1310 can be configured to perform this analysis and removal of curves on the 3D curves prior to converting the 3D curves to 2D curves. The curves may be analyzed to determine whether any portion of the curves begin and end on a same point. If a portion of a curve begins and ends on a same point, that curve may be determined to comprise a loop.

At step 235, the processor 1310 can be configured to select a first curve. Any curve may be selected as the first curve. The curve may be selected randomly. Alternatively, the curve may be selected based on a predetermined order. Although the description of the first method 200 describes analyzing the curves in a linear manner, the curves may be analyzed in parallel.

At step 237, the processor 1310 can be configured to generate a prediction, for a set of points on the curve, as to whether each point in the set is on the tooth-gingiva segmentation contour 110 between the given tooth 150 and the gingiva 130. The set may comprise all points on the curve or a subset of the points on the curve. The points in the set may be evenly spaced on the curve. The likelihood may be determined based on a derivative of the curve. The likelihood that a point is on the boundary may be determined based on an amount of curvature of the curve at that point. The amount of curvature may be based on a measured tangent to surface angle of the curve. By doing so, the processor 1310 can be configured to determine candidate boundary points for defining the tooth-gingiva segmentation contour 110 associated with the given tooth 150.

In some non-limiting embodiments of the present technology, the processor 1310 can be configured to generate a function to predict the likelihood that a point is on the boundary between teeth and gingiva. For each point that is input to the function, the function may output a predicted likelihood that the point lies on the boundary between the teeth 120 and the gingiva 130. Each point on the curve may be analyzed to determine an indication of the curvature of the curve at that point.

At step 240, the processor 1310 can be configured to determine whether all curves have been analyzed or whether there are additional curves to analyze. If there are additional curves to analyze, the processor 1310 can be configured to select a next curve at step 243. For a set of points on that curve, the likelihood that each point in the set is on the tooth-gingiva segmentation contour 110 between the given tooth 150 and the gingiva 130 may be determined at step 237.

If all curves are determined to have been analyzed at step 240, at step 245, in some non-limiting embodiments of the present technology, the processor 1310 can be configured to reduce the number of candidate points for defining the tooth-gingiva segmentation contour 110 for each curve. All points, in the set of points used for the predictions at step 237, that are below a threshold likelihood of being on the tooth-gingiva segmentation contour 110 may be filtered out to reduce the number of candidate boundary points. A point in the set of points having a maximum likelihood of being on the boundary may be selected. Various other methods may be used to filter out points from the sets of points used for predictions. The remaining points may be considered candidate points defining the tooth-gingiva segmentation contour 110. Step 245 is optional. Instead of filtering the candidate points all pairwise combinations of points may be analyzed at step 247.

Figure 7:
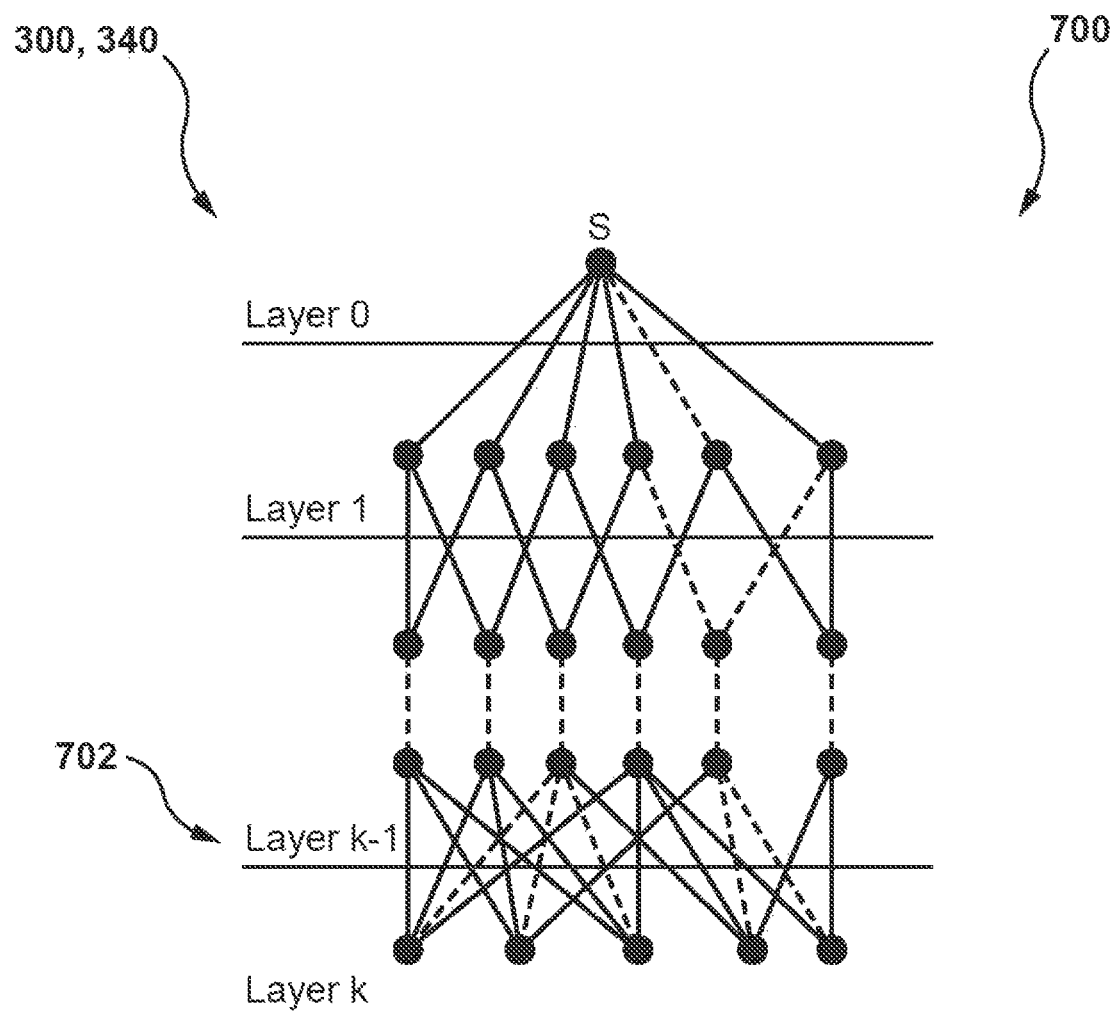
FIG. 7 shows an example graph structure generated based on points of the 3D curves either of FIG. 3 or FIG. 4, for identifying therein the boundary points defining the tooth-gingiva segmentation contour of the given tooth, according to non-limiting embodiments of the present technology.

At step 247, according to certain non-limiting embodiments of the present technology, the processor 1310 can be configured to select a single boundary point for each curve from the candidate boundary points. FIG. 7, described in further detail below, illustrates boundary points that are selected from candidate boundary points.

In some non-limiting embodiments of the present technology, the processor 1310 can be configured to select the boundary points by analyzing all possible combinations of candidate boundary points, or a subset of all possible combinations of candidate boundary points. One combination may then be selected, where that combination has a single boundary point on each curve. Boundary points may be selected that, when connected, form the tooth-gingiva segmentation contour 110 having minimal curvature. The boundary points may be selected in order to minimize the curvature of the resulting boundary line. In some non-limiting embodiments of the present technology, the processor 1310 can be configured to apply a shortest path algorithm to select the boundary points that minimize curvature of the determined the tooth-gingiva segmentation contour 110 between the given tooth 150 and the gingiva 130. The shortest path algorithm may comprise the Dijkstra algorithm, a dynamic programming algorithm, and/or any other type of shortest path algorithm.

In some non-limiting embodiments of the present technology, the processor 1310 can be configured to select the boundary points to maximize the sum of the predicted likelihood of all points. More specifically, the processor 1310 can be configured to select candidate boundary points having a higher predicted likelihood of being on the border between the given tooth 150 and the gingiva 130. The selected boundary points may be selected to minimize the curve of the tooth-gingiva segmentation contour 110 while maximizing the predicted likelihood that each point is on the border between teeth and gingiva. A boundary point might not be selected for each curve. If all points for a curve were below a threshold predicted likelihood, no candidate boundary points and/or no boundary point may be selected for that curve. This "gap" in boundary points may be remedied at step 250. If a single candidate boundary point is identified for a curve, that candidate boundary point may be selected as the boundary point for that curve.

At step 250, in some non-limiting embodiments of the present technology, the processor 1310 can be configured to fill gaps between boundary points to generate the tooth-gingiva segmentation contour 110 associated with the given tooth 150. For various reasons, there may be gaps in between boundary points. Curves may have been deleted from the analysis, for example if those curves comprised loops or were on more than one tooth. Boundary points might not have been determined on some curves. If an artifact from a scan or a model is distorting the boundary on a curve, a boundary point might not have been determined for that curve.

At step 253, according to certain non-limiting embodiments of the present technology, the processor 1310 can be configured to determine points on neighboring teeth that are closest to each other. The two points that are closest to each other on the neighboring teeth may be labeled as interface points. Corresponding points on neighboring teeth that are below a threshold distance may be selected. The threshold distanced may be determined based on known anatomical information, such as based on an average distance between teeth.

At step 255, the processor 1310 can be configured to merge the tooth-gingiva segmentation contour 110 associated with the given tooth 150 with that associated with one of the neighboring teeth at the interface points determined at step 253. To that end, in some non-limiting embodiments of the present technology, the processor 1310 can be configured to apply the shortest path algorithm to merge two tooth-gingiva segmentation contours at the two points. The line merging the two interface points may be defined on the surface of the gingiva 130. More detail on how two adjacent tooth-gingiva segmentation contours can be merged in accordance with certain non-limiting embodiments of the present technology are provided below with reference to FIG. 10.

Figure 11:
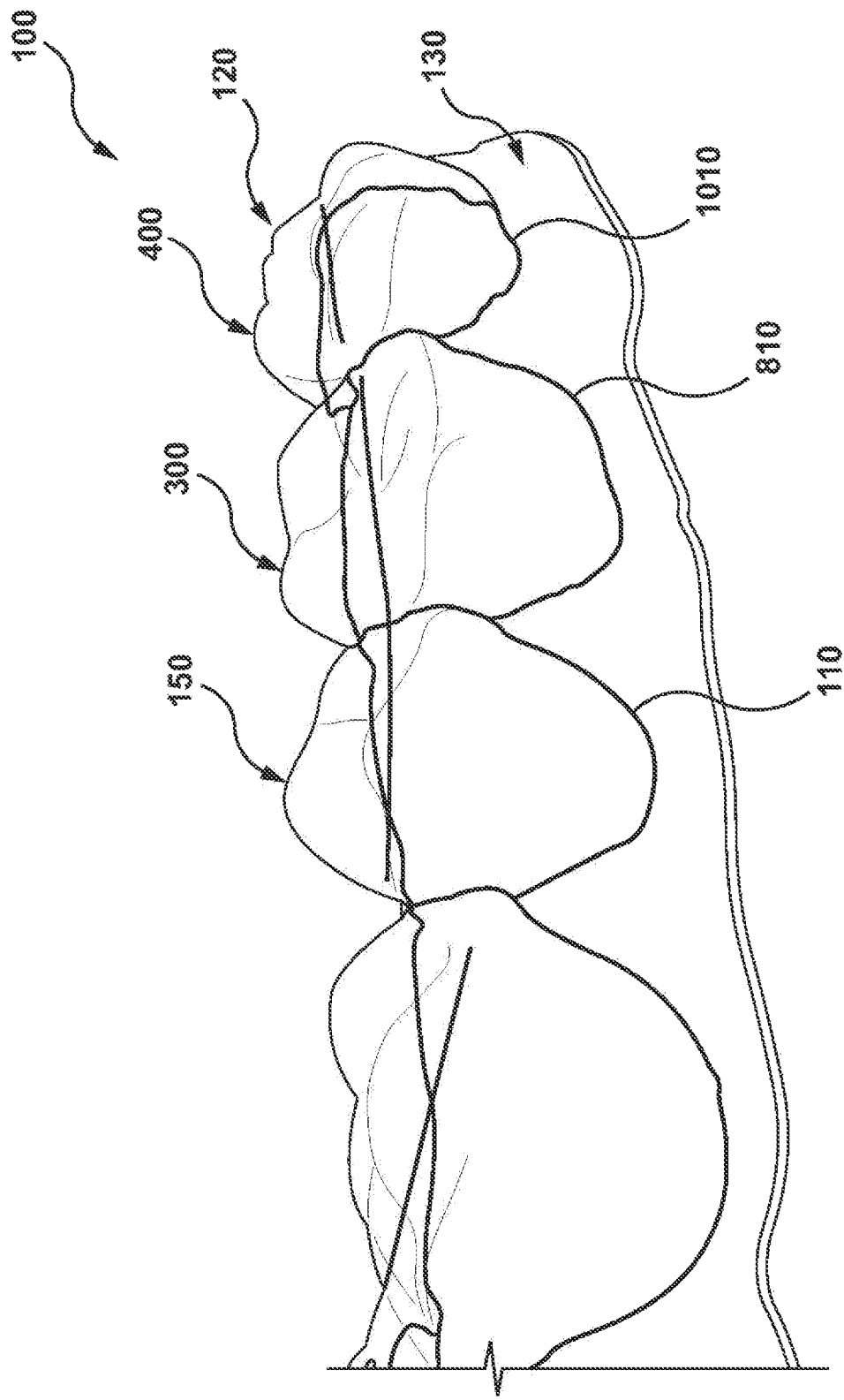
FIG. 11 shows an example of display of the archform 3D digital model of FIG. 1 with the tooth-gingiva segmentation contour associated with the given tooth on a screen according to non-limiting embodiments of the present technology.

At step 257, the processor 1310 can be configured to output the archform 3D digital model 100 for display. A respective tooth-gingiva segmentation contour of the teeth 120, such as the tooth-gingiva segmentation contour 110 associated with the given tooth 150, may be overlaid on the archform 3D digital model 100. If both lower and upper teeth are displayed, a lower teeth boundary line and an upper teeth boundary line, generated based on the respective tooth-gingiva segmentation contours, may be displayed. FIG. 11, described in further detail below, is an illustration of an exemplary display of an archform 3D digital model 100 with a boundary overlay. The display may comprise a lower set of teeth and/or an upper set of teeth.

At step 260, in some non-limiting embodiments of the present technology, the processor 1310 can be configured to use the respective tooth-gingiva segmentation contours to separate the teeth 120 from the gingiva 130 in the archform 3D digital model 100. By doing so, the processor 1310 can be configured to generate: (i) a first 3D digital model comprising the teeth 120, and (ii) a second 3D digital model comprising the gingiva 130. If both upper and lower teeth are present in the archform 3D digital model 100 received at step 203, then a first 3D digital model may be formed comprising the upper teeth, a second 3D digital model may be formed comprising the upper gingiva, a third 3D digital model may be formed comprising the lower teeth, and a fourth 3D digital model may be formed comprising the lower gingiva.

At step 263, according to certain non-limiting embodiments of the present technology, the processor 1310 can be configured to cause display the separated meshes from step 260. A user may be able to manipulate the displayed meshes. The user may select which meshes are displayed and/or whether the original archform 3D digital model 100 is displayed. The user may be able to adjust the respective tooth-gingiva segmentation contours separating the teeth 120 from the gingiva 130.

With reference to FIG. 3, there is depicted an example of curves on a first tooth 300 defined in a circular manner according to certain non-limiting embodiments of the present technology. For illustrative purposes, only the first tooth 300 is shown in FIG. 3, rather than the archform 3D digital model 100 in its entirety. According to certain non-limiting embodiments of the present technology, the first tooth 300 can be one of the teeth 120 that is different from the given tooth 150. In other non-limiting embodiments of the present technology, the first tooth 300 can be equated with the given tooth 150.

As mentioned hereinabove with respect to the given tooth 150, the first tooth 300 has a positive (buccal) side 320 and a negative (lingual) side 330. The positive side 320 may correspond to an outward facing side of the first tooth 300, and the negative side 330 may correspond to an inward facing side of the first tooth 300.

As described above in regard to FIG. 2, the processor 1310 can be configured to define curves 340 for the first tooth 300. The curves 340 may be 3D curves. The curves 340 may be drawn on the surface of the tooth. A first curve 340 may be defined, as described above and in FIG. 2, by placing vertices in the mesh on a boundary between the positive side 320 and the negative side 330 of the first tooth 300. The curve may then be rotated around the first tooth 300. In FIG. 3, curves 340 drawn in dashed lines correspond to the positive side 320 of the first tooth 300, and curves 340 drawn in solid lines correspond to the negative side 330 of the first tooth 300.

The angle between curves 340, or in other words, the step of the rotation, may be adjusted based on a desired number of curves 340 for the first tooth 300. The length of the curves 340 may be defined based on predetermined anatomical data. The length of the curves 340 may be defined to be sufficient to cross the boundary between tooth 300 and the gingiva 130.

As noted further above, in some non-limiting embodiments of the present technology, the processor 1310 can be configured to define the curves 340 using the respective plurality of cross-sectional planes, such as the given cross-sectional plane 380 extending through the central tooth axis 360 associated with the first tooth 300. The number of cross-sectional planes may be selected based on a desired number of the curves 340 for the first tooth 300. As it is best seen from FIG. 3, the given cross-sectional plane 380 can dissect the first tooth 300 through all the surface thereof to define the respective curves of the curves 340 on both the positive and negative sides 320, 300. In some non-limiting embodiments of the present technology, the cross-sectional planes can be distributed uniformly around the surface of the first tooth 300, that is, defining an equal angle therebetween. In some non-limiting embodiments of the present technology, this angle can be predetermined.

FIG. 4 shows an example of curves on a second tooth 400 of the teeth 120 defined in a horizontal manner according to non-limiting embodiments of the present technology. As described above and in FIG. 2, curves can be defined on teeth in a circular manner, horizontal manner, and/or any other suitable manner.

According to certain non-limiting embodiments of the present technology, the processor 1310 can be configured to define horizontal curves 420 on the second tooth 400 and the gingiva 130. The horizontal curves 420 may be 3D curves. The horizontal curves 420 may be similar to the curves 340, but the horizontal curves 420 may be horizontally shifted across the surface of the tooth rather than shifted in a circular fashion. The horizontal curves 420 may cross the boundary between the tooth 400 and the gingiva 130. A first curve 420 may be shifted horizontally to define multiple curves 420. The distance in between curves 420 may be selected by a user and/or predefined.

As mentioned hereinabove, in some non-limiting embodiments of the present technology, the processor 1310 can be configured to define the horizontal curves 420 by generating cross-sectional planes extending through the surface of the second tooth 400—such as an other cross-sectional plane 480 defining a respective horizontally shifted curve 440. Although in the depicted embodiments, the cross-sectional planes are shifted along the surface of the second tooth 400 in a mesiodistal direction, it should be expressly understood, that in other non-limiting embodiments of the present technology, the processor 1310 can be configured to generate the cross-sectional planes in another direction—such as a linguolabial direction, for example. Other directions for generating the cross-sectional planes are also envisioned and can include, for example, a direction extending between the mesiodistal and linguolabial directions associated with the second tooth 400, such as at a given angle to one thereof.

Also, although the cross-sectional planes depicted in FIG. 4 are parallel to each other, perpendicular to the mesiodistal direction of the second tooth 400, it should be expressly understood that in may not be the case in each and every embodiment of the present technology. For example, the processor 1310 can be configured to generate: (i) a first one of the cross-sectional planes to extend through the surface of the second tooth 400 along the mesiodistal direction at a first angle thereto, such as 45 degrees; and (ii) a second one of the cross-sectional planes to extend through the surface of the second tooth 400 along the mesiodistal direction at a second angle thereto, which can be different from the first angle and comprise, for example, 135 degrees. In some non-limiting embodiments of the present technology, each one of the cross-sectional planes defining the horizontally shifted curves along the surface of the second tooth 400 can be generated at different angle to a given direction associated with the second tooth 400.

Although curves 420 are illustrated on a single tooth 400 in FIG. 4, curves 420 may be defined on the surface of multiple teeth. For each of the illustrated curves 420 on the positive side of the tooth 400, a corresponding curve 420 may be defined on the negative side of the tooth 400.

In some non-limiting embodiments of the present technology, the processor 1310 can be configured to convert 3D curves, such as the curves 340 and/or curves 420, to respective two-dimensional (2D) curves. To that end, the processor 1310 can be configured to transfer the curves to a 2D space, defined, for example, by a 2D Cartesian coordinate system. FIG. 5 shows an example of so-converted 2D curves according to some non-limiting embodiments of the present technology. Further, in some non-limiting embodiments of the present technology, the processor 1310 can be configured to analyze the 2D curves may then be analyzed, such as to determine, for each point defining the given 3D curve (and corresponding thereto a respective 2D curve), a respective curvature parameter indicative of an amount of curvature at each point along the given 3D curves. Curves from both the positive side and the negative side of a tooth may be converted to 2D curves and analyzed to determine the respective curvature parameters at each point. In FIG. 5, curves from the positive side of the tooth are illustrated with dashed lines, and curves from the negative side of the tooth are illustrated with solid lines.

In some non-limiting embodiments of the present technology, to determine the respective curvature parameter for a given point, the processor 1310 can be configured to determine a derivative of the respective 2D curve at the given point. More specifically, in some non-limiting embodiments of the present technology, the processor 1310 can be configured to determine the respective curvature parameter for the given point of the respective 2D curve as at least one of: (i) an angle of a respective tangent vector extending from the given point to a next sequential point of the respective 2D curve; (ii) a segment curvature value of a segment extending from the given point to the next sequential point of the respective 2D curve; and (iii) a point curvature value at the given point comprising an average segment curvature value of a plurality of segments extending through the given point of the respective 2D curve.

According to certain non-limiting embodiments of the present technology, the processor 1310 can be configured to determine the segment curvature value in accordance with a following equation:

$$\text{Segment curvature} = \frac{(\text{TangentVector[nextPoint]} - \text{TangentVector[givenPoint]})}{\text{SegmentLength}}, \quad (1)$$

where TangentVector[givenPoint] is the angle of the respective tangent vector at the given point of the respective 2D cross-sectional curve;
TangentVector[nextPoint] is an angle of the respective tangent vector at the next sequential point of the respective 2D cross-sectional curve; and
SegmentLength is a length of the segment.

In some non-limiting embodiments of the present technology, a number of segments in the plurality of segments defined within the respective 2D curve can be predetermined, and comprise, for example, 10, 50, or even 100 segments, depending, for example, on availability of the computational resources of the processor 1310.

Further, based on the respective curvature parameter, in some non-limiting embodiments of the present technology, using the respective 2D curves, the processor 1310 can be configured to determine, for each point, a respective likelihood value of the given point of each 3D curve being representative of the tooth-gingiva segmentation contour 110 associated with the given tooth 150. In some non-limiting embodiments of the present technology, to determine the respective likelihood value, the processor 1310 can be configured to generate a prediction function. In some non-limiting embodiments of the present technology, the prediction function can be defined such that the greater the respective curvature parameter of the respective 2D curve at the given point, the greater is the respective likelihood value thereof of being representative of the tooth-gingiva segmentation contour 110. A mathematical relation defining the prediction function is not limited; and in some non-limiting embodiments of the present technology, can include a power function, an exponential function, a logarithmic function, and the like.

Figure 6:
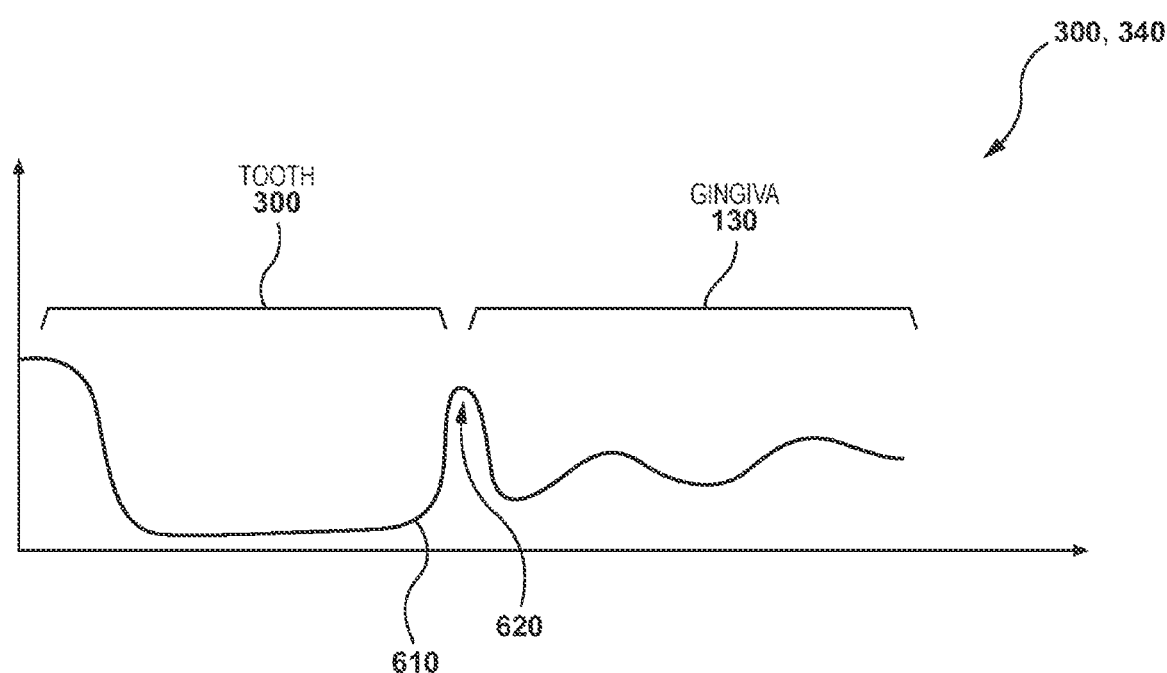
FIG. 6 shows an example of a prediction function for identifying boundary points defining the tooth-gingiva segmentation contour of the given tooth according to non-limiting embodiments of the present technology.

FIG. 6 shows an example of a prediction function graph 610 of the prediction function according to certain non-limiting embodiments of the present technology. As mentioned above, in some non-limiting embodiments of the present technology, the prediction function graph 610 indicates the amount of curvature at the given point on the respective 2D curve, corresponding to the given 3D curve defined on the surface of one of the teeth 120 and the gingiva 130, such as the curves 340 and/or curves 420 of the first and second teeth 300, 400, respectively. In the example of FIG. 6, the prediction function graph 610 initially indicates that, for example, in the first tooth 300, there is a large amount of curvature because the curve is crossing from an occlusal surface of the first tooth 300 to the side of the first tooth 300. After the initial increase in curvature due to the crown portion, the curvature increases dramatically again at point 620. This point 620 is likely at or near the respective tooth-gingiva segmentation contour associated with the first tooth 300.

As mentioned hereinabove, for more accurate analysis of an area between the first tooth 300 and the gingiva 130, in some non-limiting embodiments of the present technology, the processor 1310 can be configured to trim the respective 2D curve to remove the portion thereof representative of the occlusal surface.

Further, after determining, for each point of the 3D curves defined on the surface of the first tooth 300, the respective likelihood value of each point being representative of the respective tooth-gingiva segmentation contour, in some non-limiting embodiments of the present technology, the processor 1310 can be configured to select, based on these likelihood values, boundary points defining the respective tooth-gingiva segmentation contour.

To that end, in some non-limiting embodiments of the present technology, the processor 1310 can be configured to generate a graph structure representative of spatial relations among points within each one of the 3D curves defined on the surface of at least one of the teeth 120 in the archform 3D digital model 100, such as the curves 340 of the first tooth 300.

With reference to FIG. 7, there is depicted a graph 700 representative of points defining the curves 340 on the surface of the first tooth 300, in accordance with certain non-limiting embodiments of the present technology.

According to certain non-limiting embodiments of the present technology, each node of the graph 700 can be representative of a respective point of the respective one of the curves 340. Further, in some non-limiting embodiments of the present technology, the processor 1310 can be configured to generate the graph 700 such that nodes representative of a given single curve of the curves 340 are disposed, within the graph 700, on a respective layer (or otherwise "level"), such as a given layer 702. In this regard, the graph 700 can be referred to as a "layered graph". Thus, each layer can be defined in the graph 700 to be representative of a respective one of the curves 340 (and corresponding thereto the respective 2D curves, as mentioned above). In some non-limiting embodiments of the present technology, an order of the layers, for example, from top downward in the orientation of FIG. 7, can correspond to an order of the curves 340 defined along the surface of the first tooth 300.

It should be noted that it is not limited how the processor 1310 is configured to determine an initial node of the graph 700, that is, a top node (not separately labelled) thereof in the example of FIG. 7. For example, in some non-limiting embodiments of the present technology, the initial node can be representative of a randomly selected point of the given one of the curves 340. In other non-limiting embodiments of the present technology, the initial node can be representative of that point of the given one of the curves 340 which, among other points thereof, is associated with a maximum respective likelihood value of being representative of the respective tooth-gingiva segmentation contour.

Further, in some non-limiting embodiments of the present technology, the processor 1310 can be configured to define edges (not separately labelled) of the graph 700 connecting the nodes. In some non-limiting embodiments of the present technology, the processor 1310 can be configured to define the edges such that they connect nodes representative of two neighboring ones of the curves 340. In other words, a given edge can connect a node of a first layer with a node of a second layer (both not separately labelled), disposed immediately under or over the first layer.

According to certain non-limiting embodiments of the present technology, the processor 1310 can be configured to define the edges between a given node of the first layer with each and every node of the second layer of the graph 700. In some non-limiting embodiments of the present technology, the processor 700 can be configured to define the edges between the given node of the first layer and a subset of the nodes of the second layer. For example, the subset of nodes can include one of: (i) a predetermined proportion, such as 30%, 40%, or 50%; and (ii) a predetermined number, such as 10, 20, or 500 of closest nodes of the second layer to the given node of the first layer.

In some non-limiting embodiments of the present technology, the given edge can have a predetermined direction, such as from top downward, in the orientation of FIG. 7, or vise versa. In this case, the graph 700 can be referred to as "directed layered graph".

Further, to determine the boundary points defining the respective tooth-gingiva segmentation contour associated with the first tooth 300, in some non-limiting embodiments of the present technology, the processor 1310 can be configured to traverse the graph 700 to determine a reference path within the graph 700 including reference nodes thereof making up for a maximum total likelihood value. In other words, the processor 1310 can be configured to determine, in each layer of the graph 700, a reference node that is representative of that point of the respective one of the curves 340 which, among other points thereof, is associated with a highest respective likelihood value of being representative of the respective tooth-gingiva segmentation contour of the first tooth 300.

It is not limited how the processor 1310 can be configured to traverse the nodes of the graph 700; and in some non-limiting embodiments of the present technology, the processor 1310 can be configured to apply a graph traversal search algorithm. Various implementations of the graph traversal search algorithm may include, without limitation, a breadth-first search algorithm, a depth-first search algorithm, an iterative deepening depth-first search algorithm, a parallel breadth-first search algorithm, and others.

Further to identifying the reference nodes of the graph 700, based on the reference path extending therethrough, in some non-limiting embodiments of the present technology, the processor 1310 can be configured to determine the respective tooth-gingiva segmentation contour associated with the first tooth 300.

Figure 8:
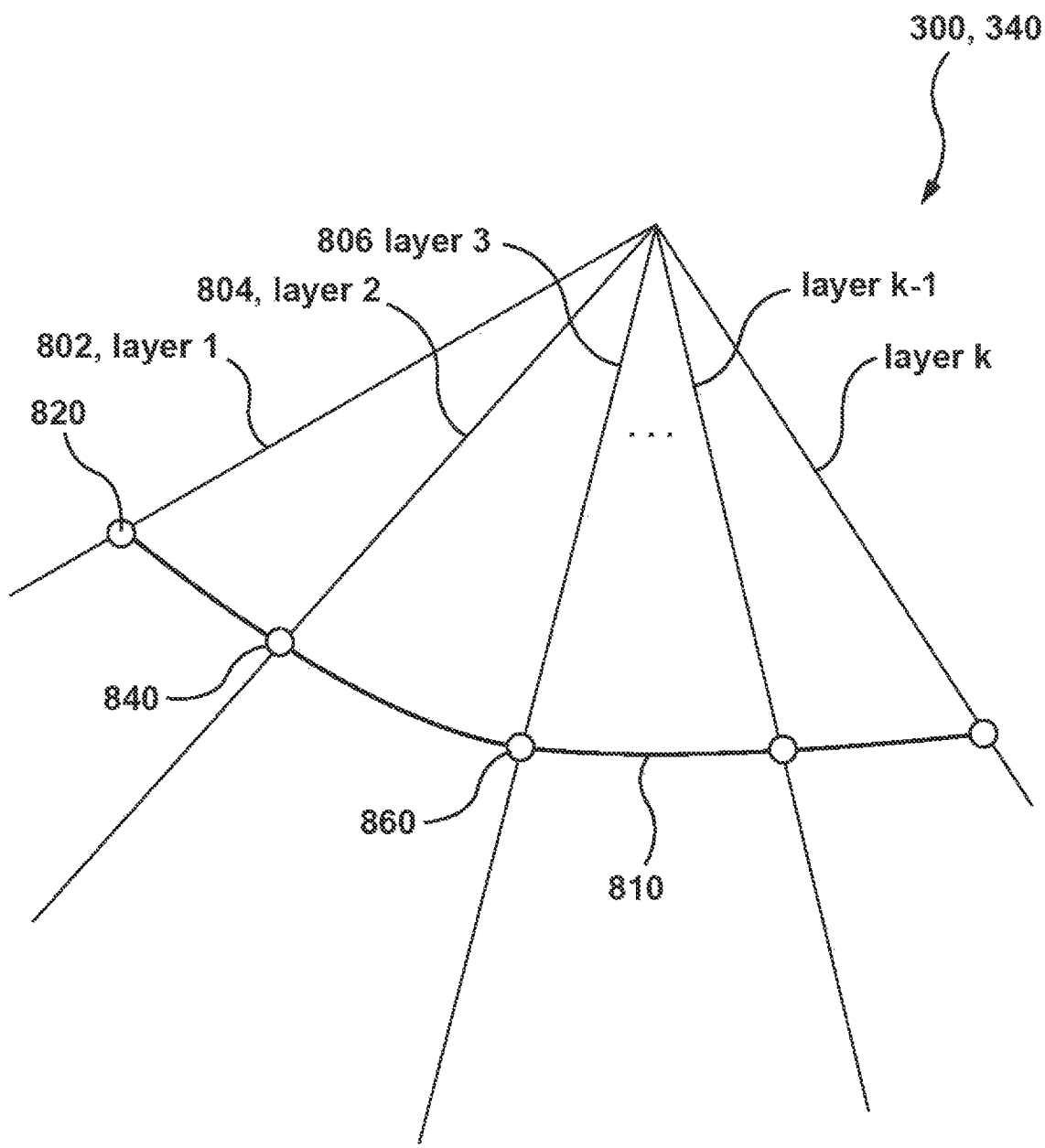
FIG. 8 shows an example of using the graph structure of FIG. 7 for generating the tooth-gingiva segmentation contour for the given tooth according to non-limiting embodiments of the present technology.

With reference to FIG. 8, there is depicted a schematic diagram of determining a first respective tooth-gingiva segmentation contour 810 associated with the first tooth 300 based on the reference path determined in the graph 700, in accordance with certain non-limiting embodiments of the present technology.

According to certain non-limiting embodiments of the present technology, the processor 1310 can be configured to apply the reference path determined in the graph 700 by identifying on each one of the curves 340, a point corresponding to a respective reference node of the graph 700 determined as described above. More specifically, the processor 1310 can be configured to determine: (i) on a first curve 802 of the curves 340, a first boundary point 820 which corresponds to the reference node of a first layer of the graph 700; (ii) on a second curve 804, a second boundary point 840 which corresponds to the reference node of a second layer, sequentially following the first layer in the graph 700; and (iii) on a third curve 806 of the curves 340, a third boundary point 860 which corresponds to the reference node of a third layer, sequentially following the second layer in the graph 700.

Thus, by joining each so determined boundary point, in some non-limiting embodiments of the present technology, the processor 1310 can be configured to generate the first respective tooth-gingiva segmentation contour 810 for the first tooth 300.

Figure 9:
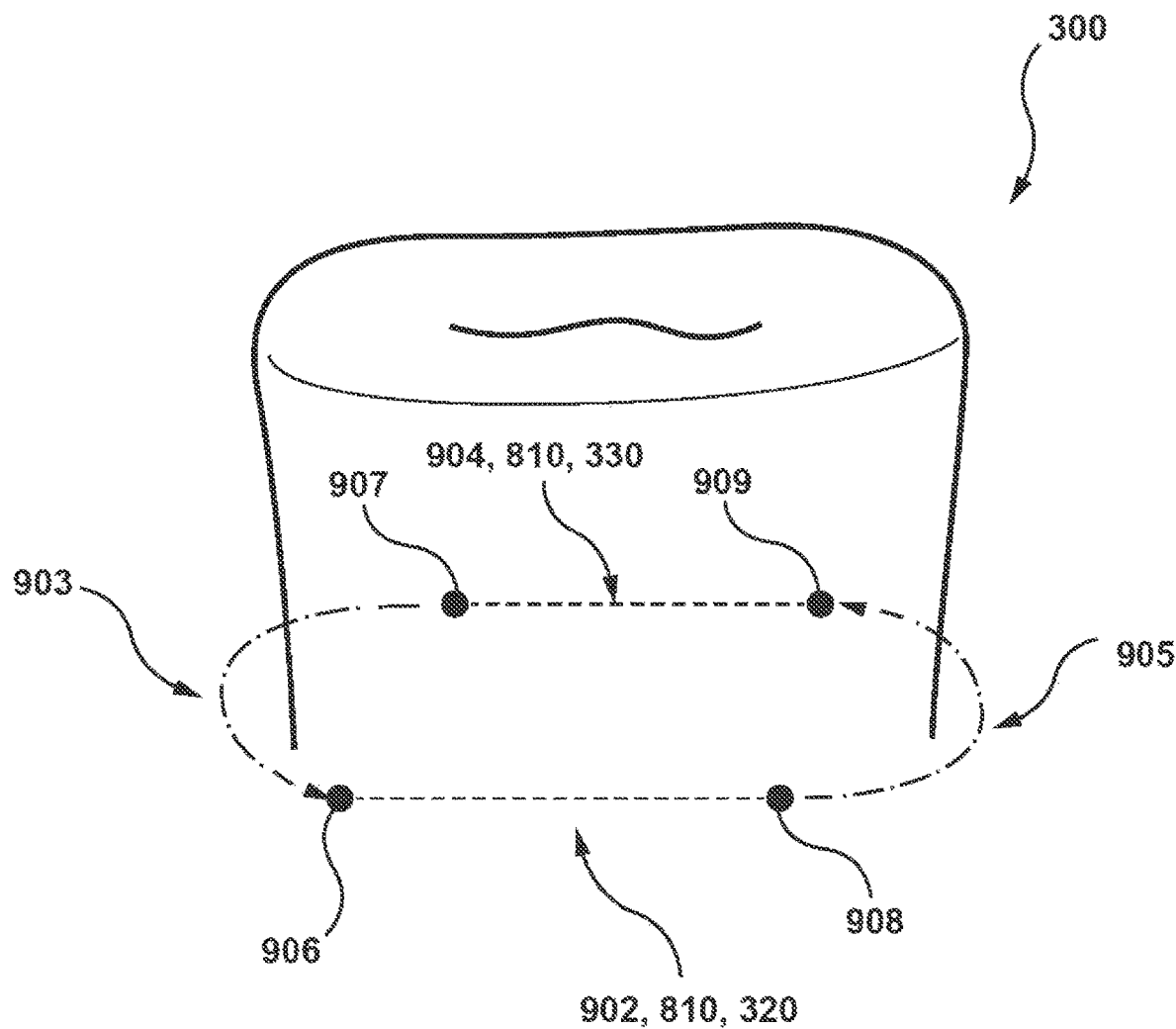
FIG. 9 shows a schematic diagram of filling gaps between segments of the tooth-gingiva segmentation contour according to non-limiting embodiments of the present technology.

In some non-limiting embodiments of the present technology, the first respective tooth-gingiva segmentation contour 810 can include gaps corresponding, for example, to interdental spaces between the first tooth 300 and its neighboring teeth. These gaps can result, for example, from an insufficient coverage of the positive and negative sides 320, 330 of the first tooth 300 with the curves 340. With reference to FIG. 9, there is depicted a schematic diagram of the first respective tooth-gingiva segmentation contour 810 having gaps corresponding to the interdental spaces associated with the first tooth 300, in accordance with certain non-limiting embodiments of the present technology.

As it can be appreciated, in the embodiments depicted in FIG. 9, the first respective tooth-gingiva segmentation contour 810 has a positive segment 902 and a negative segment 904 extending along the positive and negative sides 320, 330 of the first tooth 300, respectively. The positive and negative segments 902, 904 are divided by a first interdental gap 903 and a second interdental gap 905. Therefore, in these embodiments, the processor 1310 can be configured to fill the first and second interdental gaps 903, 905 to generate the first respective tooth-gingiva segmentation contour 810 that is continuous and unbreakable.

In some non-limiting embodiments of the present technology, to fill each one of the first and second interdental gap 903, 905, the processor 1310, can be configured to join end points of the segments of the first respective tooth-gingiva segmentation contour 810. More specifically, the processor 1310 can be configured to: (i) identify, on the first segment 902, a first positive end point 906 and a second positive end point 908; (ii) identify, on the second segment 904, a first negative end point 907 and a second negative end point 909; and (iii) join, along edges of mesh elements defining the surface of the first tooth 300 in the archform 3D digital model 100, the first positive end point 906 with the first negative end point 907 and the second positive end point 908 with the second negative end point 909. To join the end points of the first and second segments 902, 904, in some non-limiting embodiments of the present technology, the processor 1310 can be configured to apply the shortest path algorithm.

It should be expressly understood that the gaps of a given tooth-gingiva segmentation contour may not only be along the interdental spaces of the respective one of the teeth 120, but, for example, along buccal and lingual surfaces thereof. Also, there may be more than two gaps in the given tooth-gingiva segmentation contour, such as 3, 4, or 8, that can be resolved by joining end points of respective segments of the given tooth-gingiva segmentation contour as described above.

Figure 10:
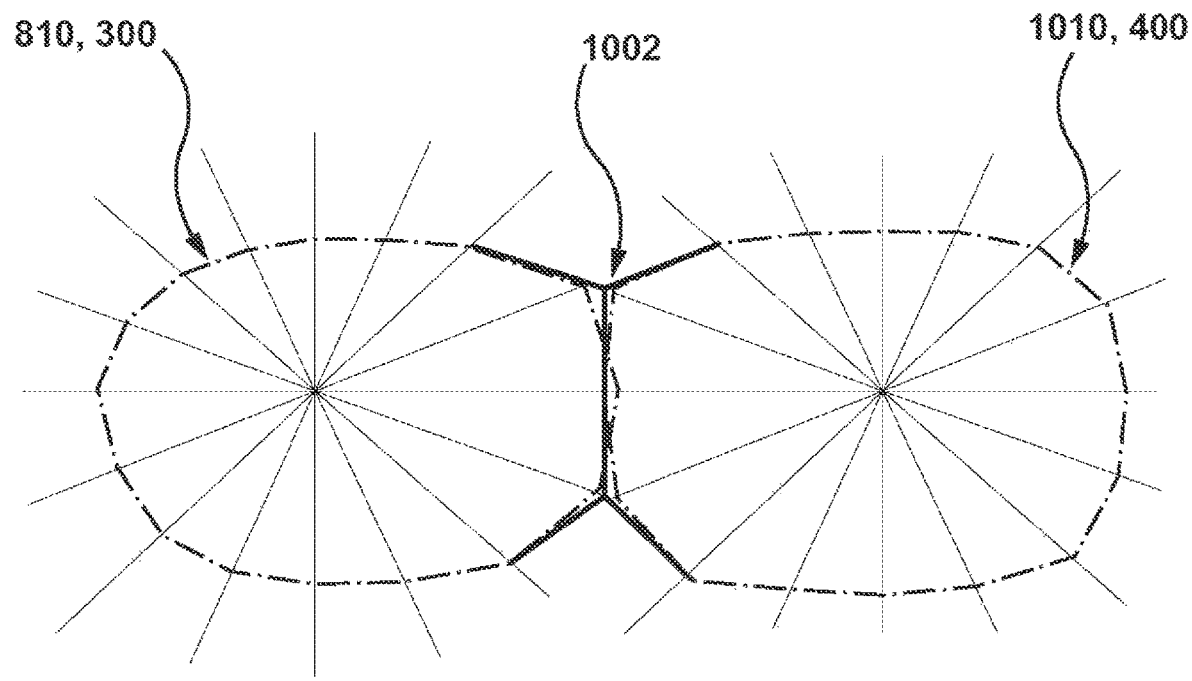
FIG. 10 shows a schematic diagram for a step of resolving intersections of portions of two adjacent tooth-gingiva segmentation contours within interdental spaces of the teeth according to non-limiting embodiments of the present technology.

Further, in some non-limiting embodiments of the present technology, after generating, for each one of the teeth 120, the respective tooth-gingiva segmentation contour, the processor 1310 can be configured to determine if the respective tooth-gingiva segmentation contours associated with two adjacent teeth intersect, such as in an interdental space between the adjacent teeth. With reference to FIG. 10, there is depicted a schematic diagram of the first respective tooth-gingiva segmentation contour 810, associated with the first tooth 300, intersecting a second respective tooth-gingiva segmentation contour 1010, associated with the second tooth 400, in accordance with certain non-limiting embodiments of the present technology.

According to certain non-limiting embodiments of the present technology, the processor 1310 can be configured to resolve an intersection between the first and second respective tooth-gingiva segmentation contours 810, 1010. To that end, in some non-limiting embodiments of the present technology, the processor 1310 can be configured to: (i) identify a first interdental portion (not separately labelled) of the first respective tooth-gingiva segmentation contour 810 extending through the interdental space between the first and second teeth 300, 400; (ii) identify a second interdental portion (not separately labelled) of the second respective tooth-gingiva segmentation contour 1010 extending through the interdental space between the first and second teeth 300, 400; and (iii) merge the first and second interdental portions into a single interdental portion 1002. Thus, the single interdental portion 1002 will be common between the first and second respective tooth-gingiva segmentation contours 810, 1010.

It is not limited how the processor 1310 can be configured to merge the first and second interdental portions; and in some non-limiting embodiments of the present technology, can include determining an average curve segment of the first and second respective tooth-gingiva segmentation contours 810, 1010 in the interdental space between the first and second teeth 300, 400.

In some non-limiting embodiments of the present technology, the processor 1310 can further be configured to smooth each one of the first and second respective tooth-gingiva segmentation contours 810, 1010. In this regard, the processor 1310 can be configured to apply one or more smoothing algorithms. In some non-limiting embodiments of the present technology, the one or more smoothing algorithms may include, without limitation, a Bezier smoothing algorithm, a Kernel smoothing algorithm, a spline smoothing algorithm, and the like.

Thus, the processor 1310 can be configured to determine the respective tooth-gingiva segmentation contour for each of the teeth 120 within the archform 3D digital model 100, such as the tooth-gingiva segmentation contour 110 for the given tooth 150, the first respective tooth-gingiva segmentation contour 810 for the first tooth 300, and the second respective tooth-gingiva segmentation contour 1010 for the second tooth 400.

Further, the processor 1310 can be configured to use the so determined respective tooth-gingiva segmentation contours for determining the orthodontic treatment. In one example, based on the respective tooth-gingiva segmentation contours, the processor 1310 can be configured to: (i) segment, within the archform 3D digital model 100 each tooth of the teeth 120 from the gingiva 130 and from each other; (ii) and use the so segmented individual tooth 3D digital models of the teeth 120, model tooth movements of the teeth 120 in the course of the orthodontic treatment, as described, for example, in a co-owned U.S. Pat. No. 10,993,782-B1, issued on May 4, 2021, entitled "SYSTEMS AND METHODS FOR DETERMINING A TOOTH TRAJECTORY", the content of which is incorporated herein by reference in its entirety.

In another example, based on the respective tooth-gingiva segmentation contours, the processor 1310 can be configured to: (i) determine a configuration of an open edge for an orthodontic appliance to be applied to the teeth 120, such as an aligner, defining a cutline thereof; and (ii) based on the so determined open edge of the aligner, cause manufacture thereof, as described, for example, in a co-owned U.S. patent application Ser. No. 17/980,868, filed on Nov. 4, 2022, entitled "SYSTEMS AND METHODS FOR DETERMINING AN EDGE OF ORTHODONTIC APPLIANCES", the content of which is incorporated by reference in its entirety.

In yet other example, based on the respective tooth-gingiva segmentation contours, the processor 1310 can be configured to determine a work area, on the surface of the given tooth 150, for example, for attaching thereon other orthodontic appliances, such as orthodontic attachments, as described in a co-owned U.S. Pat. No. 11,517,400-B1, issued on Dec. 6, 2022, and entitled "SYSTEMS AND METHODS FOR DETERMINING A POSITION FOR AN ORTHODONTIC ATTACHMENT", the content of which is incorporated herein by reference in its entirety. Other examples of using the respective tooth-gingiva segmentation contours for developing the orthodontic treatment for the subject are envisioned.

In some non-limiting embodiments of the present technology, prior to using the determined respective tooth-gingiva segmentation contours associated with the teeth 120, the processor 1310 can be configured to store data of them in an internal memory of the computing device 1300, such as one of a solid-state drive 1320 and a random-access memory 1330.

In some non-limiting embodiments of the present technology, the processor 1310 can further be configured to cause display of the so determined respective tooth-gingiva segmentation contours, for example, on a screen (not depicted) of the computing device 1300. For example, as schematically depicted in FIG. 11, in accordance with certain non-limiting embodiments of the present technology, the processor 1310 can be configured to cause display of the respective tooth-gingiva segmentation contours overlaid on the archform 3D digital model 100.

It should be expressly understood that the first method 200 can also be used for identifying boundaries not only between the teeth 120 and the gingiva 130, but also can be applied, mutatis mutandis, for determining the boundaries between individual ones of the teeth 120, such as within interdental gaps.

The first method 200 hence terminates.

Figure 12:
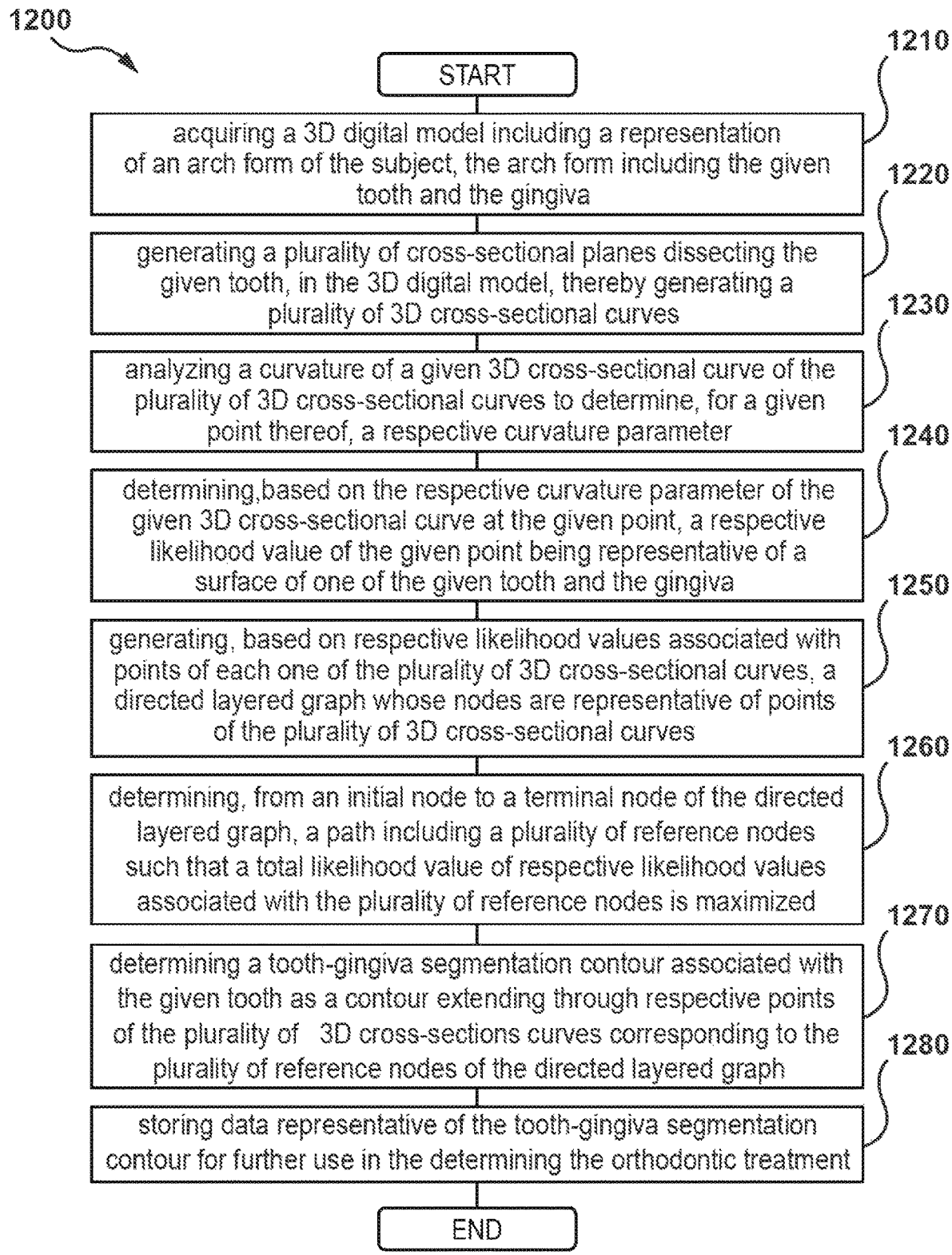
FIG. 12 shows a flowchart diagram of an other method of determining the orthodontic treatment including determining the tooth-gingiva segmentation contour for the given tooth of the subject according to non-limiting embodiments of the present technology.

Given the architecture and examples provided herein, it is now possible to execute a method for determining the orthodontic treatment for the subject. With reference to FIG. 12, there is depicted a flowchart diagram of a second method 1200, in accordance with certain non-limiting embodiments of the present technology. Akin to the first method 200, the second method 1200 can be executed by the processor 1310 of the computing device 1300.

Step 1210: Acquiring a 3D Digital Model Including a Representation of an Arch Form of the Subject, the Arch Form Including the Given Tooth and the Gingiva The second method 1200 commences at step 1210 with the processor 1310 being configured to acquire a 3D digital model representative of the subject's archform including the teeth 120 and the gingiva 130, such as the archform 3D digital model 100 described above with reference to FIG. 1.

As mentioned above, the processor 1310 can be configured to receive the archform 3D digital model 100 from an imaging device, which in various non-limiting embodiments of the present technology, may include one of an intraoral scanner and a 3D laser.

Also, in some non-limiting embodiments of the present technology, the given tooth 150 of the teeth 120 can be associated with a respective central tooth axis, data of which can be obtained (or otherwise determined) in a similar manner to the central tooth axis 360 associated with the first tooth 300, as described above with reference to FIG. 3.

The second method 1200 thus proceeds to step 1220.

Step 1220: Generating a Plurality of Cross-Sectional Planes Dissecting the Given Tooth, in the 3D Digital Model, Thereby Generating a Plurality of 3D Cross-Sectional Curves At step 1220, in some non-limiting embodiments of the present technology, the processor 1310 can be configured to generate, along the surface of the given tooth 150 in the archform 3D digital model 100, a plurality of 3D curves, which may be similar to the curves 340 associated with the first tooth 300 and described further above with reference to FIG. 3.

As mentioned further above, to generate the plurality of 3D curves, the processor 1310 can be configured to generate a respective plurality of cross-sectional planes extending through the respective central tooth axis associated with the given tooth 150, that can be similar to the given cross-sectional plane 380 associated with the first tooth 300, as described further above with reference to FIG. 3.

In some non-limiting embodiments of the present technology, the cross-sectional planes can be generated to extend through the surface of the given tooth 150 in a circular manner, as the curves 340 depicted in FIG. 3. In other non-limiting embodiments of the present technology, the cross-sectional planes can be horizontally shifted along the surface of the given tooth 150, such as the curves 420 depicted in FIG. 4, The number of cross-sectional planes along the surface of the given tooth 150 may be selected based on a desired number of the plurality of 3D curves. A given cross-sectional plane from the plurality of cross-sectional planes can dissect the given tooth 150 to define respective 3D curves on the both the positive (buccal) and negative (lingual) sides of the given tooth 150. In some non-limiting embodiments of the present technology, the cross-sectional planes can be distributed uniformly along the surface of the given tooth 150, that is, defining an equal angle therebetween. In some non-limiting embodiments of the present technology, this angle can be predetermined.

The second method 1200 hence advances to step 1230.

Step 1230: Analyzing a Curvature of a Given 3D Cross-Sectional Curve of the Plurality of 3D Cross-Sectional Curves to Determine, for a Given Point Thereof, a Respective Curvature Parameter At step 1230, according to certain non-limiting embodiments of the present technology, the processor 1310 can be configured to analyze curvature of each one of the plurality of 3D curves defined on the surface of the given tooth 150 to determine, for each point of each one of the plurality of 3D curves, a respective curvature parameter.

To that end, first, in some non-limiting embodiments of the present technology, the processor 1310 can be configured to convert each 3D curve of the plurality of 3D curves associated with the given tooth 150 to the respective 2D curves, as described above with reference to FIG. 5.

Further, prior to the analyzing, in some non-limiting embodiments of the present technology, the processor 1310 can be configured to trim each one of the respective plurality of 2D curves to remove the portion thereof representative of the occlusal surface of the given tooth 150.

Further, the processor 1310 can be configured to determine, using the respective 2D curve, for the given point of the given 3D curve of the plurality of 3D curves, the respective curvature parameter. In some non-limiting embodiments of the present technology, the respective curvature parameter of the given point can include at least one of: (i) an angle of a respective tangent vector extending from the given point to a next sequential point of the respective 2D curve; (ii) a segment curvature value of a segment extending from the given point to the next sequential point of the respective 2D curve; and (iii) a point curvature value at the given point comprising an average segment curvature value of a plurality of segments extending through the given point of the respective 2D curve.

The second method 1200 hence advances to step 1240.

Step 1240: Determining, Based on the Respective Curvature Parameter of the Given 3D Cross-Sectional Curve at the Given Point, a Respective Likelihood Value of the Given Point being Representative of a Surface of One of the Given Tooth and the Gingiva At step 1240, according to certain non-limiting embodiments of the present technology, the processor 1310 can be configured to determine, based on the respective curvature parameter associated with the given point, the respective likelihood value thereof of being representative of the tooth-gingiva segmentation contour 110 between the given tooth 150 and the gingiva 130.

To that end, as described in detail above with reference to FIG. 6, the processor 1310 can be configured to the processor 1310 can be configured to generate the prediction function. In some non-limiting embodiments of the present technology, the prediction function can be defined such that the greater the respective curvature parameter of the respective 2D curve at the given point, the greater is the respective likelihood value of the given point being representative of the tooth-gingiva segmentation contour 110.

The second method hence advances to step 1250.

Step 1250: Generating, Based on Respective Likelihood Values Associated with Points of Each One of the Plurality of 3D Cross-Sectional Curves, a Directed Layered Graph Whose Nodes are Representative of Points of the Plurality of 3D Cross-Sectional Curves At step 1250, based on the determined respective likelihood values associated with each pint of the plurality of 3D curves, the processor 1310 can be configured to determine the tooth-gingiva segmentation contour 110 associated with the given tooth 150.

To that end, in some non-limiting embodiments of the present technology, the processor 1310 can be configured to generate a respective graph representative of the plurality of 3D curves associated with the given tooth 150 and connections therewithin. The processor 1310 can be configured to generate the respective graph for the plurality of 3D curves of the given tooth 150 in a similar manner as the graph 700 for the curves 340 defined on the surface of the first tooth 300, as described above with reference to FIG. 7. As mentioned above, the respective graph can be a directed layered graph.

More specifically, according to certain non-limiting embodiments of the present technology, the processor 1310 can be configured to generate the respective graph for the given tooth 150 such that:

(i) a given layer of the respective graph is representative of points defining the respective one of the plurality of 3D curves;

(ii) a given node of the respective graph is representative of a respective point of the respective one of the plurality of 3D; and (iii) a given edge of the respective graph is representative of a connection between points of two adjacent ones of the plurality of 3D curves.

The second method hence advances to step 1260.

Step 1260: Determining, from an Initial Node to a Terminal Node of the Directed Layered Graph, a Path Including a Plurality of Reference Nodes Such that a Total Likelihood Value of Respective Likelihood Values Associated with the Plurality of Reference Nodes is Maximized At step 1260, according to certain non-limiting embodiments of the present technology, the processor 1310 can be configured to traverse the respective graph associated with the given tooth 150 to determine the reference path therein which includes nodes maximizing the total likelihood values. More specifically, as described further above with reference to FIG. 7 with respect to the graph 700, a given node of the reference path is representative of that point of the given 3D curve which, among other points thereof, is associated with the highest respective likelihood value of being representative of the tooth-gingiva segmentation contour 110 associated with the given tooth 150.

The second method 1200 hence advances to step 1270.

Step 1270: Determining a Tooth-Gingiva Segmentation Contour Associated with the Given Tooth as a Contour Extending Through Respective Points of the Plurality of 3D Cross-Sections Curves Corresponding to the Plurality of Reference Nodes of the Directed Layered Graph At step 1270, according to certain non-limiting embodiments of the present technology, based on the reference path determined within the respective graph associated with the given tooth 150, the processor 1310 can be configured to determine the tooth-gingiva segmentation contour 110.

More specifically, as described above with reference to FIG. 8 with respect to the first respective tooth-gingiva segmentation contour 810 associated with the first tooth 300, the processor 1310 can be configured to: (i) identify, on each of the plurality of 3D curves associated with the given tooth 150, a respective point corresponding to the respective reference node of the reference path; and (ii) join the so identified respective points.

As mentioned further above with reference to FIG. 9, in some non-limiting embodiments of the present technology, the processor 1310 can be configured to: (i) determine if the tooth-gingiva segmentation contour 110 generated as mentioned above has gaps, such as the first and second interdental gaps 903, 905 of the first respective tooth-gingiva segmentation contour 810 associated with the first tooth 300, dividing the tooth-gingiva segmentation contour 110 into segments; and (ii) fill the gaps by joining end points of the segments along the edges of the mesh elements defining the surface of the given tooth 150 in the archform 3D digital model 100. As mentioned above, to join the end points of the segments, the processor 1310 can be configured to apply the shortest path algorithm.

Further, in some non-limiting embodiments of the present technology, the processor 1310 can be configured to identify and resolve intersections between two adjacent tooth-gingiva segmentation contours, including the tooth-gingiva segmentation contour 110 associated with the given tooth 150, as described above with reference to FIG. 10, with respect to the first and second respective tooth-gingiva segmentation contours 810, 1010. To that end, for example, the processor 1310 can be configured to determine an average curve segment between two interdental segments of the two adjacent tooth-gingiva segmentation contours, such as the single interdental portion 1002 for the first and second respective tooth-gingiva segmentation contours 810, 1010.

Further, in some non-limiting embodiments of the present technology, the processor 1310 can be configured to apply one or more smoothing algorithms to smooth the tooth-gingiva segmentation contour 110, as described further above with reference to FIG. 10.

Thus, the processor 1310 can be configured to generate the tooth-gingiva segmentation contour 110 between the given tooth 150 and the gingiva 130 of the subject, in accordance with certain non-limiting embodiments of the present technology.

The second method 1200 hence advances to step 1280.

Step 1280: Storing Data Representative of the Tooth-Gingiva Segmentation Contour for Further Use in the Determining the Orthodontic Treatment At step 1280, in some non-limiting embodiments of the present technology, the processor 1310 can be configured to store the data of the tooth-gingiva segmentation contour 110 in the internal memory of the computing device 1300, such as at least one of the solid-state drive 1320 and the random-access memory 1330. In some non-limiting embodiments of the present technology, the processor 1310 can be configured to cause display of the tooth-gingiva segmentation contour 110 overlaid onto the archform 3D digital model 100 on the screen coupled to the computing device 1300, as schematically depicted in FIG. 11.

In some non-limiting embodiments of the present technology, the processor 1310 can further be configured to use the data of the tooth-gingiva segmentation contour 110 for developing the orthodontic treatment and/or manufacturing the orthodontic appliances for the subject. For example, the processor 1310 can be configured to use the tooth-gingiva segmentation contour 110 to isolate the given tooth 150 from the gingiva 130 and from the neighboring teeth in the archform 3D digital model 100 and further model the movements of the given tooth in the course of the orthodontic treatment. In another example, using the respective tooth-gingiva segmentation contours associated with the each one of the teeth 120, the processor 1310 can be configured to determine the configuration of the open edge of at least one aligner to be applied to the teeth 120 to implement the orthodontic treatment. Other uses of the tooth-gingiva segmentation contour 110 for developing the orthodontic treatments and manufacturing the orthodontic appliances are envisioned without departing from the scope of the present technology.

The second method 1200 hence terminates.

Thus, certain embodiments of the second method 1200, due to using the graph structure, such as the graph 700, may help more quickly identify the boundary points on the 3D curves extending along the surface of the given tooth 150 for further determining the tooth-gingiva segmentation contour 110. This may help improve the efficiency of determining the tooth-gingiva segmentation contour 110, in particular, and the processes of determining the orthodontic treatments and manufacturing the orthodontic appliances, in general.

Figure 13:
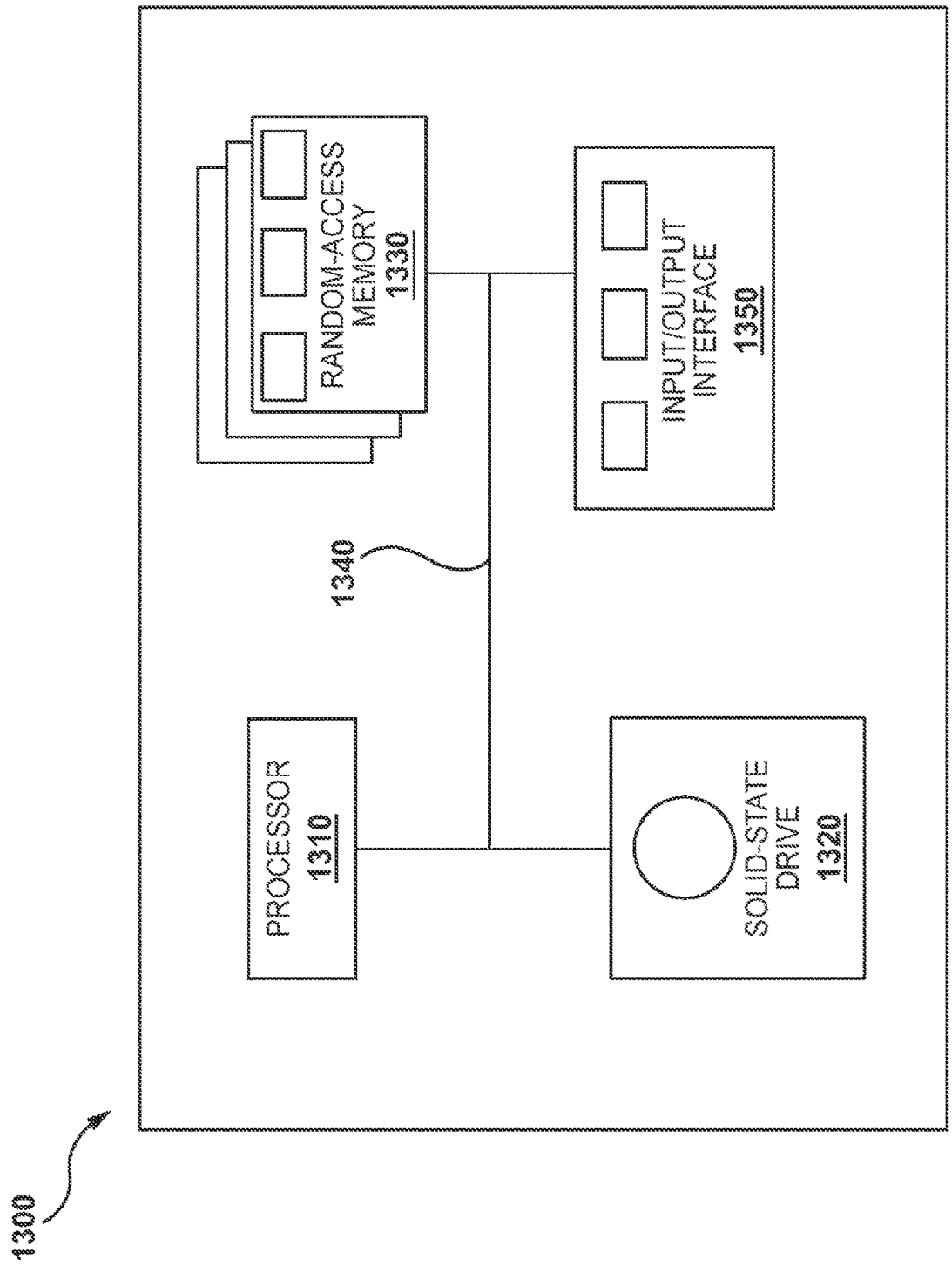
FIG. 13 shows a schematic functional diagram of a computing device that may be used to implement the methods of FIGS. 2A-C and 12 according to non-limiting embodiments of the present technology.

FIG. 13 depicts a schematic functional diagram of the computing device 1300 that may be used to implement any of the methods described herein. The computing device 1300 comprises various hardware components including one or more single or multi-core processors collectively represented by the processor 1310, the solid-state drive 1320, the random-access memory 1330 and an input/output interface 1350. Communication between the various components of the computing device 1300 may be enabled by one or more internal and/or external buses 1240 (e.g. a PCI bus, universal serial bus, IEEE 1394 "Firewire" bus, SCSI bus, Serial-ATA bus, ARINC bus, etc.), to which the various hardware components are electronically coupled.

The random-access memory 1330 and/or solid-state drive 1320 are configured in any known manner and arranged to store, among other data, one or more of: set-up data, subject data, subject medical records of one or more subjects, archform image data of the one or more of the subjects, such as the archform 3D digital model 100, and/or orthodontic treatment data.

The input/output interface 1350 allows enabling networking capabilities such as wire or wireless access. As an example, the input/output interface 1350 comprises a networking interface such as, but not limited to, a network port, a network socket, a network interface controller and the like. Multiple examples of how the networking interface may be implemented will become apparent to the person skilled in the art of the present technology. For example, but without being limiting, the input/output interface 1350 may implement specific physical layer and data link layer standards such as Ethernet™, Fibre Channel, Wi-Fi™ or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 1320 stores program instructions suitable for being loaded into the random-access memory 1330 and executed by the processor 1310, such as for executing the methods described herein according to certain aspects and embodiments of the present technology. For example, the program instructions may be part of a library or an application.

The computing device 1300 may be implemented in a generic computer system which is a conventional computer (i.e. an "off the shelf" generic computer system). The generic computer system may be a desktop computer/personal computer, and/or may be any other type of electronic device such as, but not limited to, a laptop, a mobile device, a smart phone, a tablet device, or a server.

The computing device 1300 may be implemented in a device specifically dedicated to the implementation of the present technology. For example, the computing device 1300 may be implemented in an electronic device such as, but not limited to, a desktop computer/personal computer, a laptop, a mobile device, a smart phone, a tablet device, a server, specifically designed for managing orthodontic treatment, or for making orthodontic appliances for applying the orthodontic treatment. The electronic device may also be configured to operate other devices, such as one or more imaging devices.

The computing device 1300 may be hosted, at least partially, on a server. The computing device 1300 may be partially or totally virtualized through a cloud architecture.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting.

What is claimed is:

1. A computer-implementable method of determining an orthodontic treatment for a subject, the method comprising:
    acquiring a 3D digital model including a representation of an arch form of the subject, the arch form including the given tooth and the gingiva;
    generating a plurality of cross-sectional planes dissecting the given tooth along a tooth axis associated therewith in the 3D digital model, thereby generating a plurality of 3D cross-sectional curves;
    analyzing a curvature of a given 3D cross-sectional curve of the plurality of 3D cross-sectional curves to determine, for a given point thereof, a respective curvature parameter;
    determining, based on the respective curvature parameter of the given 3D cross-sectional curve at the given point, a respective likelihood value of the given point being representative of a tooth-gingiva segmentation contour;
    generating, based on respective likelihood values associated with points of each one of the plurality of 3D cross-sectional curves, a directed layered graph whose nodes are representative of points of the plurality of 3D cross-sectional curves;
    determining, from an initial node to a terminal node of the directed layered graph, a path including a plurality of reference nodes such that a total likelihood value of respective likelihood values associated with the plurality of reference nodes is maximized;
    determining, the tooth-gingiva segmentation contour associated with the given tooth as a contour extending through respective points of the plurality of 3D cross-sections curves corresponding to the plurality of reference nodes of the directed layered graph; and storing data representative of the tooth-gingiva segmentation contour for further use in the determining the orthodontic treatment.

2. The method of claim 1, wherein the generating the directed layered graph is executed such that:
   (i) a given layer of the directed layered graph is representative of points defining the respective one of the plurality of 3D cross-sectional curves;
   (ii) a given node of the directed layered graph is representative of a respective point of a respective one of the plurality of 3D cross-sectional curves; and
   (iii) a given edge of the directed layered graph is representative of a connection between points of two adjacent ones of the plurality of 3D cross-sectional curves.

3. The method of claim 1, wherein the plurality of cross-sectional planes comprises a predetermined number of cross-sectional planes.

4. The method of claim 1, wherein the generating the plurality of cross-sectional planes comprises generating the plurality of cross-sectional planes through the tooth axis of the given tooth.

5. The method of claim 1, wherein the generating the plurality of cross-sections planes is such that the plurality of cross-sectional planes are shifted horizontally along a surface of the given tooth relative to each other.

6. The method of claim 1, wherein:
   the analyzing the curvature of the given 3D cross-sectional curve comprises converting the given 3D cross-sectional curve into a respective 2D cross-sectional curve; and
   determining the respective curvature parameter at the given point of the given 3D cross-sectional curve comprises determining the respective curvature parameter at a corresponding point of the respective 2D cross-sectional curve.

7. The method of claim 6, prior to the analyzing, further comprising trimming a portion of the given 3D cross-sectional curve extending along an occlusal surface of the given tooth.

8. The method of claim 6, wherein the respective curvature parameter, at the corresponding point of the respective 2D cross-sectional curve, comprises at least one of:
   (i) an angle of a respective tangent vector extending from the corresponding point to a next sequential point of the respective 2D cross-sectional curve;
   (ii) a segment curvature value of a segment extending from the corresponding point to the next sequential point of the respective 2D cross-sectional curve; and
   (iii) a point curvature value at the corresponding point comprising an average segment curvature value of a plurality of segments extending through the corresponding point of the respective 2D cross-sectional curve.

9. The method of claim 8, further comprising determining the segment curvature value according to a formula:

$$\text{Segment curvature} = \frac{(\text{TangentVector}[\text{nextPoint}] - \text{TangentVector}[\text{givenPoint}])}{\text{SegmentLength}},$$

where TangentVector[givenPoint] is the angle of the respective tangent vector at the corresponding point of the respective 2D cross-sectional curve;

TangentVector[nextPoint] is an angle of the respective tangent vector at the next sequential point of the respective 2D cross-sectional curve; and SegmentLength is a length of the segment.

10. The method of claim 8, wherein the plurality of segments for determining the point curvature includes a predetermined number of segments.

11. The method of claim 1, wherein the determining the respective likelihood value of the given point is such that the greater the respective curvature parameter is, the greater the respective likelihood value is.

12. The method of claim 1, wherein:
   the 3D digital model comprises a plurality of mesh elements defining a surface of the arch form of the subject;
   the plurality of cross-sectional planes dissects the given tooth along two opposing surfaces thereof; and wherein the determining the tooth-gingiva segmentation contour comprises:
      identifying, from the respective points of the plurality of 3D cross-sectional curves corresponding to the plurality of reference nodes of the directed layered graph, along each of the opposing surfaces: a first edge point and a second edge point; and
      joining, the first and second edge points on both opposing surfaces of the given tooth along edges of the plurality of mesh elements of the 3D digital model.

13. The method of claim 12, wherein the joining comprises applying a shortest path algorithm.

14. The method of claim 13, wherein the shortest path algorithm is a Dijkstra's shortest path algorithm.

15. The method of claim 12, wherein the two opposing surfaces comprise a labial surface and a lingual surface of the given tooth.

16. The method of claim 12, further comprising:
   identifying: (i) a portion of the tooth-gingiva segmentation contour associated with the given tooth extending through an interdental space between the given tooth and an adjacent tooth; and (ii); and identifying a portion of an other tooth-gingiva segmentation contour associated with the adjacent tooth extending through the interdental space; and
   merging the portions into a single portion of both the tooth-gingiva segmentation contour and the other tooth-gingiva segmentation contour associated with the given and adjacent teeth and extending through the interdental space therebetween.

17. The method of claim 16, further comprising smoothing the tooth gingiva segmentation contour.

18. The method of claim 1, further comprising causing display of the tooth-gingiva segmentation contour associated with the given tooth within the 3D digital model.

19. A system for determining an orthodontic treatment for a subject, the system comprising at least one processor and at least one non-transitory computer-readable medium comprising executable instructions that when executed by the at least processor, cause the system to:
   acquire a 3D digital model including a representation of an arch form of the subject, the arch form including the given tooth and the gingiva;
   generate a plurality of cross-sectional planes dissecting the given tooth along a tooth axis associated therewith in the 3D digital model, thereby generating a plurality of 3D cross-sectional curves;

analyze a curvature of a given 3D cross-sectional curve of the plurality of 3D cross-sectional curves to determine, for a given point thereof, a respective curvature parameter;

determine, based on the respective curvature parameter of the given 3D cross-sectional curve at the given point, a respective likelihood value of the given point being representative of a tooth-gingiva segmentation contour;

generate, based on respective likelihood values associated with points of each one of the plurality of 3D cross-sectional curves, a directed layered graph whose nodes are representative of points of the plurality of 3D cross-sectional curves;

determine, from an initial node to a terminal node of the directed layered graph, a path including a plurality of reference nodes such that a total likelihood value of respective likelihood values associated with the plurality of reference nodes is maximized;

determine a tooth-gingiva segmentation contour associated with the given tooth as a contour extending through respective points of the plurality of 3D cross-sections curves corresponding to the plurality of reference nodes of the directed layered graph; and store, in the at least one non-transitory computer-readable memory, data representative of the tooth-gingiva segmentation contour for further use in the determining the orthodontic treatment.

20. The system of claim 19, wherein the at least one processor further causes the system to generate the directed layered graph such that:

(i) a given layer of the directed layered graph is representative of points defining the respective one of the plurality of 3D cross-sectional curves and connections therewithin;

(ii) a given node of the directed layered graph is representative of a respective point of a respective one of the plurality of 3D cross-sectional curves; and (iii) a given edge of the directed layered graph is representative of a connection between points of two adjacent ones of the plurality of 3D cross-sectional curves.

* * * * *